(12) United States Patent
Chawla et al.

(10) Patent No.: US 12,360,954 B2
(45) Date of Patent: Jul. 15, 2025

(54) MULTIPLE BITMAP SINGLE HEAD/TAIL RETIREMENT TRANSACTION ORDER

(71) Applicant: Dell Products L.P., Round Rock, TX (US)

(72) Inventors: Rohit K Chawla, Scotch Plains, NJ (US); Morgan A Clark, South Orange, NJ (US); Ahsan Rashid, Piscataway, NJ (US); Marc A De Souter, Wayne, NJ (US)

(73) Assignee: DELL PRODUCTS L.P., Round Rock, TX (US)

( * ) Notice: Subject to any disclaimer, the term of this patent is extended or adjusted under 35 U.S.C. 154(b) by 80 days.

(21) Appl. No.: 18/453,672

(22) Filed: Aug. 22, 2023

(65) Prior Publication Data

US 2025/0068595 A1 Feb. 27, 2025

(51) Int. Cl.
 *G06F 16/17* (2019.01)
 *G06F 16/18* (2019.01)

(52) U.S. Cl.
 CPC ...... *G06F 16/1734* (2019.01); *G06F 16/1865* (2019.01)

(58) Field of Classification Search
 None
 See application file for complete search history.

(56) References Cited

U.S. PATENT DOCUMENTS

| | | | |
|---|---|---|---|
| 9,697,219 B1 * | 7/2017 | Wang | G06F 16/1734 |
| 2005/0097149 A1 | 5/2005 | Vaitzblit et al. | |
| 2007/0005665 A1 | 1/2007 | Vaitzblit et al. | |
| 2014/0195480 A1 | 7/2014 | Talagala et al. | |
| 2015/0309739 A1 | 10/2015 | Sato et al. | |
| 2016/0078085 A1 | 3/2016 | Hu et al. | |
| 2018/0081957 A1 * | 3/2018 | Johnston | G06F 16/2379 |
| 2018/0300236 A1 * | 10/2018 | Xu | G06F 12/0246 |
| 2020/0226035 A1 | 7/2020 | Li | |

OTHER PUBLICATIONS

Chawla, et al "Multi-Log Checkpoint-Based Retirement Transaction Order in Multi-Chunk Log" U.S. Appl. No. 18/453,644, filed Aug. 22, 2023, 57 pages.
Notice of Allowance received for U.S. Appl. No. 18/453,644 dated Mar. 21, 2025, 47 pages.

\* cited by examiner

*Primary Examiner* — Dawaune A Conyers
(74) *Attorney, Agent, or Firm* — Amin, Turocy & Watson, LLP

(57) ABSTRACT

A method facilitating an update to a file system comprises storing a set of transaction log entries at log space of a storage log associated with the file system, the transaction log entries comprising instructions for fulfilling a set of transactions that define change to the file system, assigning, in an ordered sequence corresponding to a sequence order of journalling of the set of transaction log entries to the log space, transaction markers to a set of transaction marker lists, wherein the transaction markers reference the set of transaction log entries, and, for individual transaction markers of the transaction markers, preventing reuse of the log space corresponding thereto until an evaluation of the set of transaction marker lists results in a determination that writing of all modified system metadata corresponding thereto has been executed and that the transaction marker is set equal to a global head transitioning the transaction markers.

20 Claims, 14 Drawing Sheets

900 ⟶

STORING, BY A SYSTEM OPERATIVELY COUPLED TO A PROCESSOR, A SET OF TRANSACTION LOG ENTRIES AT LOG SPACE OF A STORAGE LOG ASSOCIATED WITH A FILE SYSTEM, WHEREIN THE TRANSACTION LOG ENTRIES COMPRISE INSTRUCTIONS FOR FULFILLING A SET OF TRANSACTIONS THAT DEFINE CHANGE TO THE FILE SYSTEM. 902

ASSIGNING, BY THE SYSTEM, IN AN ORDERED SEQUENCE CORRESPONDING TO A SEQUENCE ORDER OF JOURNALLING OF THE SET OF TRANSACTION LOG ENTRIES TO THE LOG SPACE, TRANSACTION MARKERS TO A SET OF TRANSACTION MARKER LISTS COMPRISING ONE OR MORE TRANSACTION MARKER LISTS, WHEREIN THE TRANSACTION MARKERS REFERENCE THE SET OF TRANSACTION LOG ENTRIES. 904

EMPLOYING, BY THE SYSTEM, A SET OF LOG HOLDS ASSOCIATED WITH A SET OF MEMORY BUFFERS THAT COMPRISE THE MODIFIED SYSTEM METADATA, WHEREIN RESPECTIVE ONES OF THE LOG HOLDS ARE MAINTAINED TO PREVENT THE REUSE OF THE LOG SPACE UNTIL THE WRITING OF MODIFIED SYSTEM METADATA CORRESPONDING TO MEMORY BUFFERS OF THE SET OF MEMORY BUFFERS AND CORRESPONDING TO THE RESPECTIVE ONES OF THE LOG HOLDS IS WRITTEN TO THE PERSISTENT STORAGE, AND FURTHER SATISFIES THE EVALUATION OF THE SET OF TRANSACTION MARKER LISTS OR ANOTHER EVALUATION OF THE SET OF TRANSACTION MARKER LISTS. 906

APPLYING, BY THE SYSTEM, THE LOG HOLDS AS CORRESPONDING ON A 1-TO-1 BASIS TO LOG STORAGE OBJECTS OF THE LOG SPACE TO WHICH THE TRANSACTION LOG ENTRIES ARE JOURNALLED. 908

FOR INDIVIDUAL TRANSACTION MARKERS OF THE TRANSACTION MARKERS, PREVENTING, BY THE SYSTEM, REUSE OF THE LOG SPACE CORRESPONDING TO THE TRANSACTION MARKER UNTIL AN EVALUATION OF THE SET OF TRANSACTION MARKER LIST RESULTS IN A FIRST DETERMINATION THAT WRITING OF ALL MODIFIED SYSTEM METADATA, CORRESPONDING TO THE TRANSACTION MARKER HAS BEEN EXECUTED TO PERSISTENT STORAGE, AND IN A SECOND DETERMINATION THAT THE TRANSACTION MARKER IS SET EQUAL TO A GLOBAL HEAD TRANSITIONING THE TRANSACTION MARKERS OF THE SET OF TRANSACTION MARKER LISTS IN THE SEQUENCE ORDER. 910

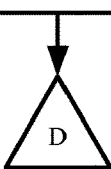

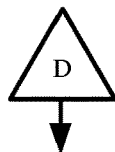

SYNCHRONIZING, BY THE SYSTEM, THE MODIFIED SYSTEM METADATA CORRESPONDING TO THE SET OF TRANSACTION LOG ENTRIES AT SELECTED INTERVALS UNASSOCIATED WITH THE EVALUATION OF THE SET OF TRANSACTION MARKER LISTS AND WITH ADDITIONAL EVALUATIONS OF THE SET OF TRANSACTION MARKER LISTS. 912

AS A RESULT OF THE EVALUATION OF THE SET OF TRANSACTION MARKER LISTS AND AS A RESULT OF THE WRITING OF THE MODIFIED SYSTEM METADATA TO THE PERSISTENT STORAGE, IDENTIFYING, BY THE SYSTEM, THE LOG SPACE COMPRISING THE TRANSACTION LOG ENTRIES AS BEING AVAILABLE TO BE RELEASED BY THE SYSTEM. 914

CLEARING, BY THE SYSTEM, THE LOG SPACE OF TRANSACTION LOG ENTRIES OF THE SET OF TRANSACTION LOG ENTRIES AT INTERVALS DIRECTLY ASSOCIATED WITH THE EVALUATION OF THE SET OF TRANSACTION MARKER LISTS AND WITH ADDITIONAL EVALUATIONS OF THE SET OF TRANSACTION MARKER LISTS. 916

```
POPULATING, BY A SYSTEM OPERATIVELY COUPLED TO A PROCESSOR, A SET
OF TRANSACTION MARKER LISTS COMPRISING ONE OR MORE TRANSACTION
MARKER LISTS WITH AN ORDERED SEQUENCE OF TRANSACTION MARKERS
INDIVIDUALLY CORRESPONDING TO TRANSACTION LOG ENTRIES OF A SET OF
TRANSACTIONS JOURNALLED TO MULTIPLE CHUNKS OF A LOG SPACE FOR
EFFECTING CHANGE TO A FILE SYSTEM. 1102
```

IDENTIFYING, BY THE SYSTEM, THE TRANSACTION MARKERS BY SEQUENCE
NUMBERS ACCORDING TO THE ORDERED SEQUENCE. 1104

MODIFYING, BY THE SYSTEM, MEMORY BUFFERS TO COMPRISE MODIFIED
SYSTEM METADATA. 1106

SYNCHRONIZING, BY THE SYSTEM, THE MODIFIED SYSTEM METADATA TO A
PERSISTENT STORAGE. 1108

PERFORMING THE SYNCHRONIZING, BY THE SYSTEM, OF THE MODIFIED
SYSTEM METADATA AT SELECTED INTERVALS UNASSOCIATED WITH A SERIES
OF ITERATIONS OF EVALUATING OF THE SET OF TRANSACTION MARKER
LISTS. 1110

IN CONNECTION WITH THE POPULATING OF THE BITMAP SPACE, APPLYING, BY
THE SYSTEM, A SET OF LOG HOLDS CORRESPONDING TO STORAGE LOG
OBJECTS AT THE MULTIPLE CHUNKS. 1112

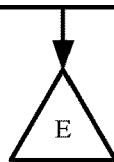

FIG. 11

MULTIPLE BITMAP SINGLE HEAD/TAIL RETIREMENT TRANSACTION ORDER

REFERENCE TO RELATED APPLICATIONS

This application is related to U.S. patent application Ser. No. 18/453,644, filed Aug. 22, 2023, and entitled "MULTI-LOG CHECKPOINT-BASED RETIREMENT TRANSACTION ORDER IN MULTI-CHUNK LOG."

BACKGROUND

Various operations of a computing system can employ modification to multiple logs or to multiple chunks of a log, where one log/chunk is modified at a different time or at least partially at a same time as another log chunk. The intent of the one or more logs is to allow for all changes/updates to be made together. That is, the one or more logs can allow for the consistency of a file system to be maintained.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example system can comprise a processor, and a memory that stores executable instructions that, when executed by the processor, facilitate performance of operations, comprising journalling transaction log entries to log storage objects defining multiple chunks of a storage log associated with a file system, wherein the transaction log entries comprise instructions for fulfilling a set of transactions, and wherein the transactions define change to the file system; populating a set of transaction marker lists comprising one or more transaction marker lists with an ordered sequence of transaction markers referencing the transaction log entries; synchronizing a first portion of modified system metadata corresponding to a first portion of the transaction log entries; in connection with synchronizing of the first portion of the modified system metadata, evaluating the set of transaction marker lists to identify a first portion of transaction markers referencing the first portion of the transaction log entries; and for identifying the first portion of transaction markers, identifying the transaction markers of the first portion of transaction markers as referencing the modified system metadata having been synchronized and as having a location at the ordered sequence such that all lower sequenced transaction markers have already been retired from the set of transaction marker lists, and retiring the first portion of transaction markers from the set of transaction marker lists.

An example method can comprise storing, by a system operatively coupled to a processor, a set of transaction log entries at log space of a storage log associated with a file system, wherein the transaction log entries comprise instructions for fulfilling a set of transactions that define change to the file system; assigning, by the system, in an ordered sequence corresponding to a sequence order of journalling of the set of transaction log entries to the log space, transaction markers to a set of transaction marker lists comprising one or more transaction marker lists, wherein the transaction markers reference the set of transaction log entries; and for individual transaction markers of the transaction markers, preventing, by the system, reuse of the log space corresponding to the transaction marker until an evaluation of the set of transaction marker lists results in a first determination that writing of all modified system metadata, corresponding to the transaction marker has been executed to persistent storage, and in a second determination that a sequence number, corresponding to the sequence order, of the transaction marker is equal to a sequence number of a global head transitioning the transaction markers of the set of transaction marker lists in the sequence order.

An example non-transitory computer-readable medium can comprise executable instructions that, when executed by a processor, can facilitate performance of operations. The operations can comprise populating a set of transaction marker lists, comprising one or more transaction marker lists, with an ordered sequence of transaction markers individually corresponding to transaction log entries of a set of transactions journalled to multiple chunks of a log space for effecting change to a file system, wherein the transaction markers are identified by sequence numbers according to the ordered sequence; in connection with the journalling of the set of transactions, performing evaluations of the set of transaction marker lists over a series of iterations to determine which transaction markers can be identified as free due to modified system metadata related thereto being already synchronized to the persistent storage to effect the change to the file system; and in connection with individual evaluations of the evaluations, retiring from the set of transaction marker lists one or more transaction markers wherein the one or more transaction markers have been identified as free and wherein all transaction markers having lower sequence numbers, of the sequence numbers, than the one or more transaction markers have also been retired.

An example benefit of one or more of the above-indicated method, system and/or non-transitory computer-readable medium can be reduction in the number of validations of transaction metadata relative to existing approaches. For example, the one or more embodiments herein can employ a set of transaction marker lists, comprising one or more transaction marker lists, for referencing transactions being executed, wherein a set of iterations of evaluating of the set of transaction marker lists are performed to determine when to retire transaction markers from the set of transaction marker lists, and subsequently when to clear log space to which the transactions are journalled as transaction log entries.

This retirement can be performed in an ordered sequence based on transitioning of a global head along the transaction markers where the ordered sequence corresponds to an ordered sequence of the journalling of the transactions to the log space (e.g., to multiple chunks of the log space). Accordingly, transaction markers can be retired absent a check of any dependency among the transactions, as is done in existing frameworks. In connection therewith, the synchronizing of modified system metadata, corresponding to the transactions and for effecting a change to a file system, can be performed in an order different from the ordered sequence. Additionally, the above-indicated method, system and/or non-transitory computer-readable medium can be more easily scaled, as compared to existing frameworks.

Another example benefit can be using a set of log holds and maintaining transaction entry metadata defining the transactions at corresponding log storage objects (e.g., defining the log). In connection therewith, order of writes to persistent storage can be omitted and the log chunks (also herein referred to as chunks) can be initially journalled, and subsequently memory buffers can be synchronized, in any suitable order, even at least partially in parallel with one another (e.g., at least partially concurrently with one another). This is in contrast to existing frameworks where transaction metadata is cleared in specific order from the storage log upon synchronization.

BRIEF DESCRIPTION OF THE DRAWINGS

The technology described herein is illustrated by way of example and not limited to the accompanying figures in which like reference numerals indicate similar elements.

FIG. 9 illustrates a process flow diagram of a method of tracking of synchronizing of modified system metadata to persistent storage and of subsequent clearing of storage log space, in accordance with one or more embodiments and/or implementations described herein.

FIG. 10 illustrates a continuation of the process flow diagram of FIG. 9 of a method of tracking of synchronizing of modified system metadata to persistent storage and of subsequent clearing of storage log space, in accordance with one or more embodiments and/or implementations described herein.

FIG. 11 illustrates a process flow diagram of a method of tracking of synchronizing of modified system metadata to persistent storage and of subsequent clearing of storage log space, in accordance with one or more embodiments and/or implementations described herein.

DETAILED DESCRIPTION

Overview

Figure 1:
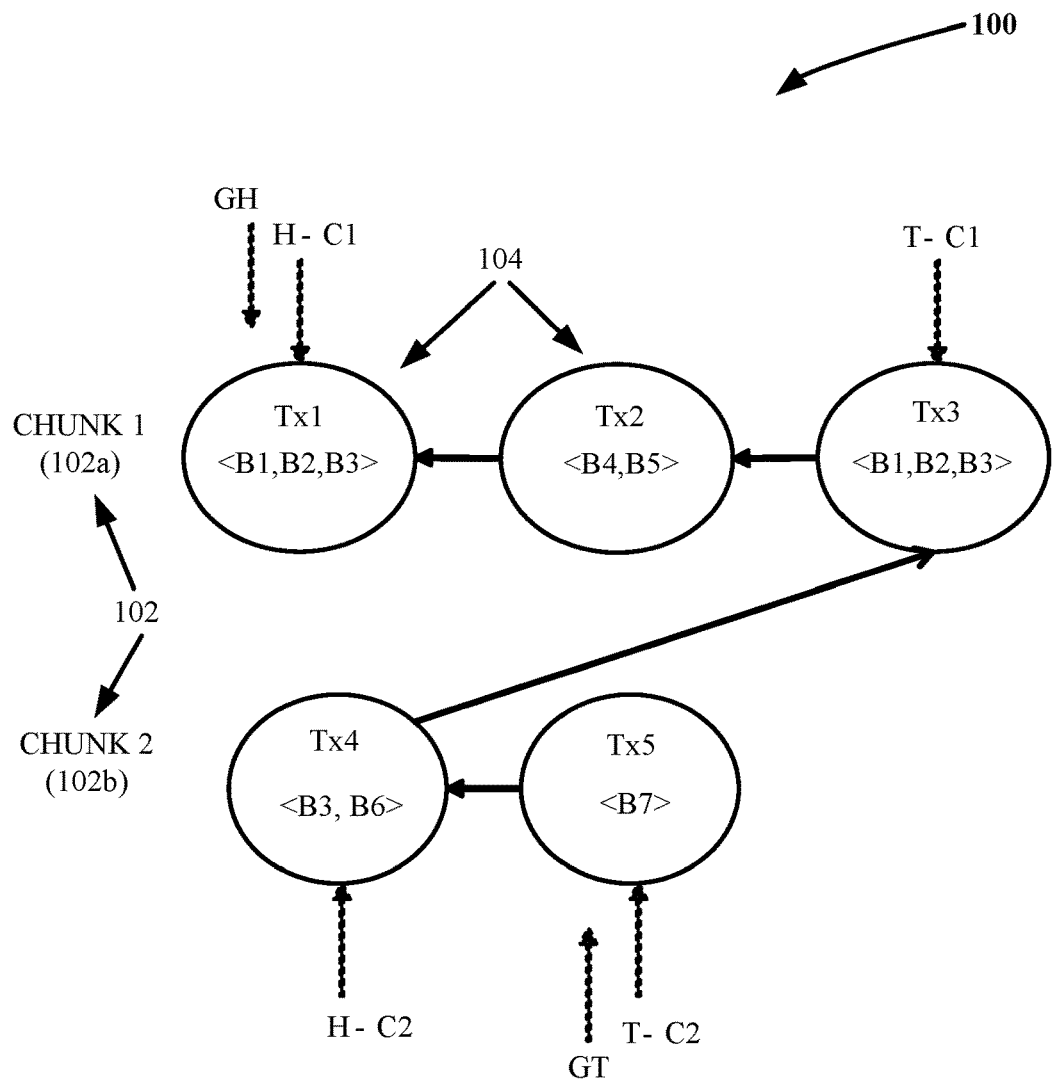
FIG. 1 illustrates a block diagram of a set of transactions that have been written to plural chunks of a storage log, in accordance with one or more embodiments and/or implementations described herein.

The technology described herein is generally directed towards systems, methods and/or computer program products for facilitating use of and resetting of a storage log and of data storage blocks defining the storage log. This process is generally facilitated by use of a set of transaction marker lists, comprising one or more transaction marker lists, for tracking transaction log entries of transactions corresponding to multiple chunks of the storage log.

As noted above, various operations of a file system can employ modification to multiple logs or to multiple chunks of a log, where one log/chunk is modified at a different time or at least partially at a same time as another log chunk. An intent of the one or more logs (or one or more chunks) is to allow for rapid writing of metadata to the storage logs, while still enabling all changes/updates of metadata by different operations to be made in parallel with one another. That is, the one or more logs can continue to allow for the consistency of the file system to be maintained.

If the computing system crashes, power failure occurs, write of one or more memory buffers fail, and/or the like, the one or more logs are the source of re-obtaining the metadata updates/changes. In the case of modification to multiple logs or to multiple chunks of a same log, maintaining the in-memory buffers of the metadata of the transactions in order and without having deleted one or more sections thereof can be costly in terms of CPU bandwidth, memory, validation actions, etc.

An existing approach can be to employ only a single chunk per log. The head of the chunk is not moved through a transaction of multiple transactions of the log until the transaction is synchronized (e.g., modified system metadata of memory buffers corresponding to the transaction is written to persistent storage). If the system crashes, the log can be replayed. However, a single chunk log or global log is not scalable and often becomes a bottleneck of operations.

Furthermore, when journalling to multiple chunks, each chunk cannot be treated independently when data journalled to one chunk can be dependent upon metadata journalled to another chunk. That is, if one chunk is synchronized first (e.g., if metadata corresponding to transactions in one chunk) and then the log storage objects cleared, this can cause an update (e.g., in response to a system crash) to fail (e.g., cause inconsistency in the file system) due to one or more cross-chunk dependencies having been deleted.

To account for one or more deficiencies of existing approaches, described herein are one or more embodiments that can employ multi-chunk storage logs (e.g., storage logs with multiple chunks) and which can maintain a set of log holds and a transaction marker list for tracking writing progress of modified system metadata. That is, a set of transaction markers maintained in memory and referencing a set of transaction log entries can be populated to a set of transaction marker lists comprising one or more in-memory transaction marker lists. Evaluating of the transaction marker list can allow for determination of whether modified system metadata corresponding to transaction markers at the transaction marker list has been synchronized to persistent storage. Evaluating of the set of transaction marker lists also can allow for determination of whether sequence numbers of transaction markers are equal to, greater than or lower than a sequence number of a global head of the multiple chunks. In this way, such determination relative to the global head can allow for an indirect determination that transaction markers having lower sequence numbers than other transaction markers at the set of transaction marker lists have been already retired from the set of transaction marker lists before retiring the other transaction markers. In this way, modified system metadata corresponding to the transaction markers having lower sequence numbers will have already been synchronized to persistent storage, thus eliminating any requirement of verification of lack of one or more dependencies among transactions to enact the aforementioned retirement of the transaction markers.

In connection with each iteration of evaluating of the set of transaction marker lists, a set (e.g., one or more) of transaction markers can be retired, corresponding log holds can be released, corresponding memory buffers can be cleared, and corresponding log storage objects of the multi-chunk storage logs can be cleared to allow for journalling of additional transactions thereto. Accordingly, a set of validations performed relative to the iterations of evaluating of the set of transaction marker lists can be employed, rather than using continuous validation actions intending to keep a global order of buffers to write before releasing the log space, as are used in existing frameworks.

Furthermore, as indicated above, retirement of the transaction markers from the set of transaction marker lists can be performed in an ordered sequence based on transitioning of a global head along the transaction markers where the ordered sequence corresponds to an ordered sequence of the journalling of the transactions to the log space. Accordingly, transaction markers can be retired absent a check of any dependency among the transactions, as is done in existing frameworks. In connection therewith, the synchronizing of modified system metadata, corresponding to the transactions and for effecting a change to a file system, can be performed in an order different from the ordered sequence. Additionally, the above-indicated method, system and/or non-transitory computer-readable medium can be more easily scaled, as compared to existing frameworks.

Indeed, in connection with the one or more embodiments described herein, synchronization of the modified system metadata to the persistent storage can be unordered, performed in an order different from an order of journalling of the transactions to the multi-chunk storage log, and/or be executed relative to multiple chunks of a multi-chunk storage log simultaneously.

For example, in one or more embodiments described herein, to make a change to system metadata of a file system, such as by writing new metadata, e.g., modified system metadata, to persistent storage, a storage system, such as a storage log system, can be employed. When making the change to the file system, it is desired that the system metadata be consistent both before and after the change. Such change to a file system can comprise various sub-changes that together are performed at various aspects of the file system to elicit the change. To aid in managing these various sub-changes, one or more transactions can be journalled to one or more chunks of a storage system, such as a storage log. The transactions can be journalled in the form of transaction log entries comprising and defined by transaction entry metadata. The storage log is not the permanent repository for this change, and thus, in one or more embodiments, one or more memory buffers can be written out with the modified system metadata and the memory buffers synchronized to persistent storage (e.g., the modified system metadata is written to the permanent location on the persistent storage).

That is, a system described herein can journal to the multiple chunks in parallel with one another. Each chunk can be synchronized to persistent storage separately or at least partially in parallel with one another. A set of log holds can be employed to maintain the initial transaction entry metadata of the chunks at the log storage objects defining and/or providing for the multiple chunks. A set of transaction marker lists, comprising one or more transaction marker lists, can be employed to track the transaction log entries of the transactions at the storage log, which transaction log entries correspond to the synchronizing of memory buffers to the persistent storage. A set of sequentially ordered transaction markers can be populated to the set of transaction marker lists, where the transaction markers represent the sequential order of journalling of the transaction log entries to the storage log. Sequence numbers can be applied to the transaction markers according to the sequential order.

A set of iterations of evaluating of the set of transaction marker lists are employed to identify transaction markers individually matching a global head transitioning the transaction markers at the set of transaction marker lists. In response, where the global head references a transaction marker that corresponds to modified system metadata having already been synchronized, and all transaction markers having lower sequence number have already been retired, the transaction marker can be retired (e.g., where all respective modified system metadata is synchronized to persistent storage) and the global head moved to a transaction marker that is next in the sequential order. In response to the retirement of a set of transaction markers at an iteration of the evaluating, log storage objects, corresponding to a set of transaction markers retired in that iteration, can be cleared in bulk, upon releasing of respective log holds corresponding to the log storage objects. Such releasing is also performed in response to the retirement of a set of transaction markers at the iteration of the evaluating. As a result of the clearing of the log storage objects, respective space thereat can be made available for new transaction entry metadata to be written to the storage log for a new set of transactions to effect new change to a respective file system.

Terminology

As used herein, the terms "cost" or "expense" can refer to power, memory and/or processing power.

As used herein, the term "data" can comprise "metadata."

As used herein, the term "data storage object" can by synonymously used with "data storage block."

Reference throughout this specification to "embodiment," "one embodiment," "an embodiment," "one implementation," and/or "an implementation," means that a feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the features, structures, or characteristics may be combined in any suitable manner in one or more embodiments/implementations.

As used herein, the terms "employing" or "employed by" can refer to an element (e.g., a hardware device) that is currently being employed, that has already been employed and/or that is to be employed.

As used herein, the term "entity" can refer to a machine, device, smart device, component, hardware, software and/or human.

A "group of hardware" can refer to a subset of hardware devices of an operation system, which hardware devices can comprise, but are not limited to, storage nodes, switch nodes, server nodes and/or assembly devices, and which operation system can comprise one or more computing systems.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, a "memory buffer" is a temporary storage area in a memory that stores metadata transferring between two or more locations, such as between an application and a device location.

As used herein, the term "power" can refer to electrical and/or other source of power available to the operation system.

As used herein, the term "resource" can refer to power, memory, CPU bandwidth, processing power, hardware and/or software.

As used herein, the term "set" can refer to one or more.

As used herein, "synchronization" of memory buffers, of chunks, of logs, and/or of modified system metadata can refer to the writing of modified system metadata to persistent storage, which modified system metadata corresponds to a result of and/or is based on transactional operations defined by the transactions being carried out at/for/in relation to a file system.

As used herein, a "transaction log chunk" refers to a portion of a storage log assigned to a central processing unit (CPU) or a set of CPUs.

As used herein, a "transaction log entry" refers to an entry to a storage log (e.g., present in the log) that defines a transaction. The transaction log entry comprises and is defined by transaction entry metadata, and thus a transaction likewise comprises transaction entry metadata.

As used herein, a "transaction marker list" provides an in-memory representation of transaction log entries, where each entry in the transaction marker list is a transaction marker.

As used herein, a "transaction marker" refers on a 1-to-1 basis to a transaction record or transaction log entry.

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIGS. 1-12 and/or with other figures described herein.

Turning first to FIG. 1, a non-limiting architecture is illustrated comprising a set of chunks 102 of a storage log 100, where each chunk 102 comprises a head (H) and a tail (T). Chunk 1 (102*a*) comprises a head H-C1 and a tail T-C1. Chunk 2 (102*b*) comprises a head H-C2 and a Tail T-C2.

The chunks 102, and thus the storage log 100, comprise a set of transactions 104 (e.g., transactions Tx1, Tx2, Tx3, Tx4 and Tx5). Transaction log entries, comprised by transaction entry metadata, and defining these transactions 104, have been journalled to the storage log 100 comprising the multiple chunks 102 (e.g., a first chunk 102*a* and a second chunk 102*b*). As illustrated, transaction entry metadata has been journalled to both chunks 102*a* and 102*b*. Chunk 1 comprises transactions Tx1, Tx2 and Tx3. Chunk 2 comprises transactions Tx4 and Tx5.

The transaction entry metadata has been journalled for the purpose of being executed (e.g., the instructions defined by the transaction log entries corresponding to the transactions are to be executed), resulting in one or more actions at a file system associated with the storage log 100. The one or more actions result in the writing of modified system metadata to persistent storage. That is, the modified system metadata is a result of and/or is based on transactional operations being carried out and corresponding to the transactions. Generally, this process is referred to herein as synchronizing of the modified system metadata. Modified system metadata is written to persistent storage, using a set of memory buffers to aid the writing, to be further described below relative to FIG. 2.

As illustrated, many of the transactions 104 comprise plural blocks or other portions defining the respective transactions 104. For example, Tx1 comprises blocks B1, B2 and B3; Tx2 comprises blocks B4 and B5; Tx3 comprises blocks B1, B2 and B3; Tx4 comprises Blocks B3 and B6; and Tx5 comprises block B7. As used herein, these "blocks" can refer to separate log storage objects enabling storage space defining the storage log 100 and corresponding to modified system metadata.

Also as illustrated, one or more transactions comprise the same one or more blocks. For example, block B3 is comprised by Tx1, Tx3 and Tx4. That is, block B3 is first written when journalling transaction Tx1. Block B3 is then updated two times, when journalling Tx3 and when writing Tx4. For synchronization purposes of this transaction entry metadata, both chunks can be synchronized at least partially at the same time. As such, there are numerous transaction (Tx) dependencies 150 even in the small exemplary storage log embodiment illustrated. These dependencies 150 can comprise Tx3 being explicitly dependent on Tx1, Tx4 being explicitly dependent Tx3, Tx2 being implicitly dependent on Tx1, Tx3 being implicitly dependent on Tx1, and Tx5 being implicitly dependent on Tx4.

Accordingly, in a case where a file system, or computing system comprising the file system, fails, regeneration of the modified system metadata can be performed by scanning the chunks 102 of the storage log 100. However, if one chunk is missing, if chunk 1 or chunk 2 has already been synchronized and the respective log storage blocks cleared, or if a transaction Tx having a dependency has already been synchronized and the respective log storage blocks cleared, it can be impossible to regenerate a cleared transaction log entry from the remaining transaction log entries alone and therefore difficult or impossible to regenerate modified system metadata.

Further, in an existing framework, a validation of all remaining transactions and blocks can be performed each time that a block has been synchronized and is ready to be cleared. This continuous validation can employ an undesired amount of resources including memory, CPU bandwidth, time, processing power, etc. Indeed, when synchronizing thousands of logged transactions, transaction log entries or transactions blocks at a time, across many storage logs and chunks, such validation process does not scale well and indeed can be a bottleneck causing reduced processing traffic, stalling out operations, causing system, application or microservice failure, and/or the like.

Differently, the one or more embodiments described herein can account for one or more of these deficiencies and can employ a system comprising a series of transaction marker list evaluations, log holds and memory buffers to segregate sets of transactions, track the synchronization of associated modified system metadata, and determine when to release log storage objects to which the transactions are journalled (e.g., as transaction log entries).

For example, a set of log holds 180 can be employed to account for the transaction (Tx) dependencies 150. A separate log hold 180 can be employed for each block of a transaction 104, and thus each transaction 104 can have plural log holds corresponding to the transaction 104. As illustrated, a log hold 180 can be generated for a respective block at a first instance of use of that block. For example, a log hold 180 can be generated for block B1 with respect to Tx1, and thus the same log hold is already in place when the synchronization of the chunk 102a moves to transaction Tx3 and to the updating of block B1 relative thereto.

Figure 2:
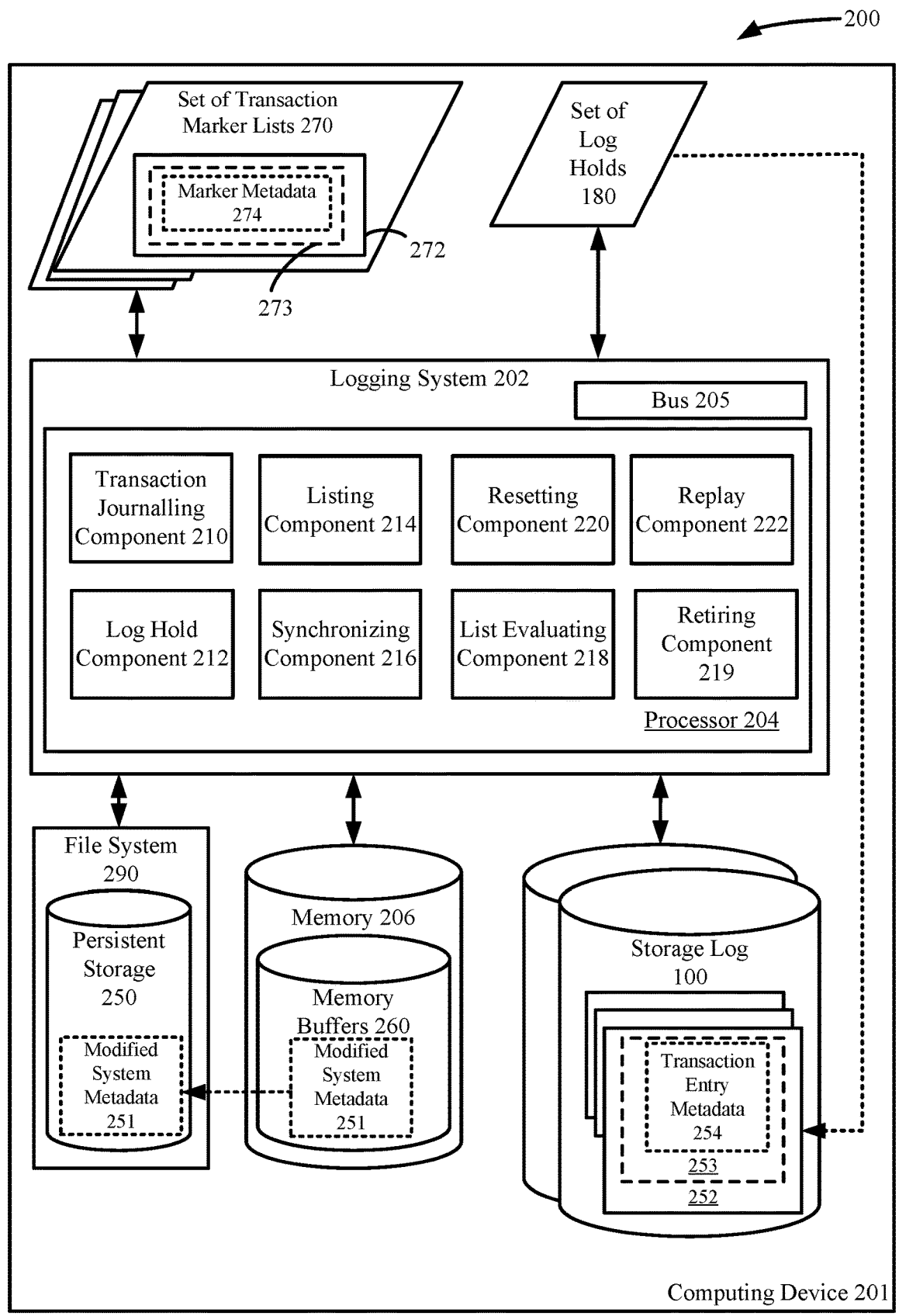
FIG. 2 illustrates a block diagram of a non-limiting computing system comprising a logging system for facilitating the synchronizing of modified system metadata corresponding to the transactions of FIG. 1 to persistent storage, in accordance with one or more embodiments and/or implementations described herein.

Turning next to FIG. 2, description turns to a non-limiting architecture 200 comprising a logging system 202 that can function to manage the synchronization of transactions 104 of a file system 290 corresponding to one or more chunks of one or more storage logs (e.g., storage log 100) to persistent storage (e.g., persistent storage 250). While referring here to one or more processes, operations, facilitations and/or uses of the non-limiting system 200, description provided herein, above and/or below also can be relevant to one or more other non-limiting system architectures described herein (e.g., of FIG. 1). Repetitive description of like elements and/or processes employed in respective embodiments is omitted for sake of brevity.

Generally, the logging system 202 can comprise any suitable computing devices, hardware, software, operating systems, drivers, network interfaces and/or so forth. As illustrated, the logging system 202 can comprise a transaction journalling component 210, log hold component 212, listing component 214, synchronizing component 216, list evaluating component 218, retiring component 219, resetting component 220 and replay component 222. These components can be comprised by a processor 204 and/or one or more of these components can be external to the processor 204. A bus 205 operatively couples the processor 204 and a memory 206.

Communication among the components of the logging system 202 can be by any suitable method. Communication can be facilitated by wired and/or wireless methods including, but not limited to, employing a cellular network, a WAN (e.g., the Internet), and/or a LAN. Suitable wired or wireless technologies for facilitating the communications can include, without being limited to, Wi-Fi, GSM, UMTS, WiMAX, enhanced GPRS, 3GPPLTE, 3GPP2UMB, HSPA, ZIGBEE® and other 802.XX wireless technologies and/or legacy telecommunication technologies, BLUETOOTH®, SIP, RF4CE protocol, WirelessHART protocol, 6LoWPAN, Z-Wave, an ANT protocol, a UWB standard/protocol and/or other proprietary and/or non-proprietary communication protocols.

Discussion first turns to the processor 204, memory 206 and bus 205 of the logging system 202.

In one or more embodiments, the logging system 202 can comprise a processor 204 (e.g., computer processing unit, microprocessor, classical processor and/or like processor). In one or more embodiments, the processor 204 can be and/or be comprised by a controller.

In one or more embodiments, a component (which also can be referred to as a module) associated with logging system 202, as described herein with or without reference to the one or more figures of the one or more embodiments, can comprise one or more computer and/or machine readable, writable and/or executable components and/or instructions that can be executed by processor 204 to facilitate performance of one or more processes defined by such component and/or instruction.

In one or more embodiments, the logging system 202 can comprise a machine-readable memory 206 that can be operably connected to the processor 204. The memory 206 can store computer-executable instructions that, upon execution by the processor 204, can cause the processor 204 and/or one or more other components of the logging system 202 to perform one or more actions. In one or more embodiments, the memory 206 can store computer-executable components.

The logging system 202 and/or a component thereof as described herein, can be communicatively, electrically, operatively, optically and/or otherwise coupled to one another via a bus 205 to perform functions of non-limiting system architecture 200, logging system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, logging system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the logging system 202 can reside in the cloud, and/or can reside locally in a local computing environment (e.g., at a specified location).

In addition to the processor 204 and/or memory 206 described above, the logging system 202 can comprise one or more computer and/or machine readable, writable and/or executable components and/or instructions that, when executed by processor 204, can facilitate performance of one or more operations defined by such component and/or instruction.

Direction first turns to the transaction journalling component 210 that can journal the one or more transaction log entries 253, defined by transaction entry metadata 254, of one or more transactions 104 to the storage log 100. The journalling of the transaction log entries 253 can be by way of standard journalling process for data to one or more log storage objects 252, as understood by one having ordinary skill in the art.

In connection with FIG. 1, the storage log 100 can have multiple chunks 102. The storage log 100 can be part of and/or separate from a computing device 201 comprising the logging system 202. The journalling performed by and/or directed by the transaction journalling component 210 can be performed at two or more chunks at least partially at a same time.

In one or more embodiments, based on functioning of the logging system 202 allowing for scalability, the transaction journalling component 210 can reuse cleared space at the storage log 100. In one or more other embodiments, based on functioning of the logging system 202 also allowing for scalability, the transaction journalling component 210 can switch the journalling of transaction log entries 253 for a set of transactions to a second storage log in response to usable log space at the first storage log being determined to have decreased and to have satisfied a defined usable log space threshold. The usable log space threshold can be defined by a user entity or administrator entity of the logging system 202 or computing device 201 and/or by the transaction journalling component 210.

Figure 4:
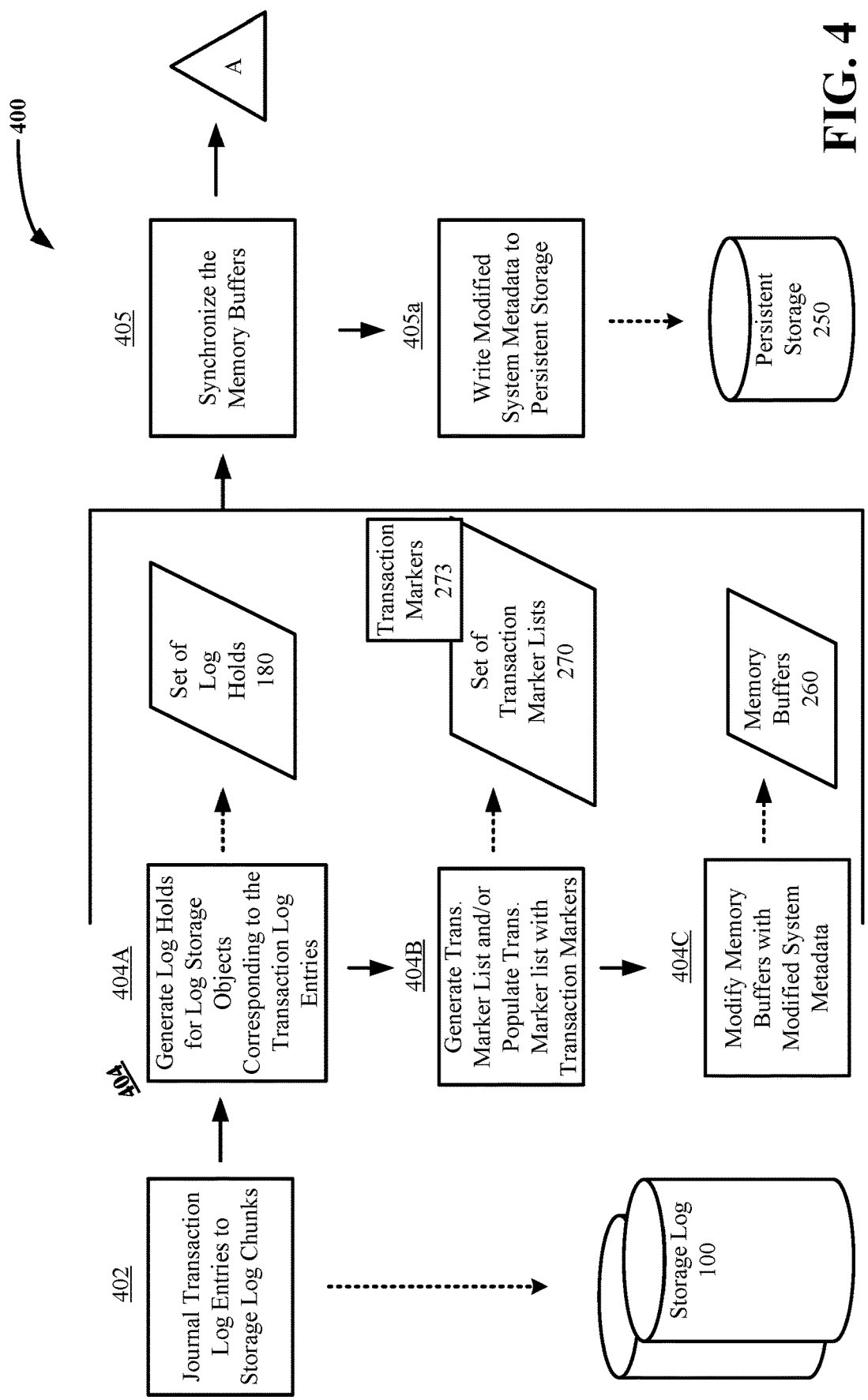
FIG. 4 illustrates a block diagram of a portion of operations that can be performed by the logging system of FIG. 2, in accordance with one or more embodiments and/or implementations described herein.

Turning next to FIG. 4, along with FIG. 2, a first subset of a set 400 of operations performed by the logging system 202 are illustrated. That is, during journalling of the transaction log entries 253 to the log storage objects 252 at step 402, a set of log holds 180 can be generated by a log hold component 212 at step 404A. Each log hold 180 can essentially provide a direct hold (and/or indirect hold by way of associated notification or other lock feature) to prevent clearing and re-use of a respective log storage object 252 until the log hold 180 has been released. As mentioned with respect to FIG. 1, a log hold 180 can be generated for each block or log storage object 252 employed or based on any other suitable unit. Data defining the log holds 180 can be stored at the respective log storage objects 252 and/or can be stored elsewhere, such as at the memory 206.

Put another way, the log holds 180 can be generated corresponding to a set of memory buffers 260 (e.g., in-memory buffers) that correspond to the log storage objects 252 and which represent the transaction entry metadata 254. The memory buffers 260 can be generated and/or employed by the transaction journalling component 210 and/or by any other suitable component. The memory buffers 260 serve as temporary storage in memory (e.g., at memory 206) for storing modified system metadata 251, corresponding to the transaction entry metadata 254 and to be lazily transferred into the persistent storage 250. The memory buffers 260 can be comprised by the memory 206 or can be external to the memory 206, such as stored at another memory different from the memory 206.

In one or more embodiments, each memory buffer 260 can store modified system metadata 251 corresponding to a result of transaction operation related to a single block or log storage object 252 of the storage log 100 or based on any other suitable unit. Accordingly, in one or more embodiments, a log storage object 252, memory buffer 260 and log hold 180 can correspond to one another in a plurality of sets of log storage objects 252, memory buffers 260 and log holds 180.

In one or more embodiments, the memory buffers 260 can be modified to comprise the modified system metadata 251 in association with the journalling of the transaction log entries 253 (e.g., at step 303).

Also, in connection with the journalling (step 402), memory buffer modification (step 404C), and log hold generation and application (step 404A), the listing component 214 can generate a set of transaction markers 273 which can be assigned by the listing component 214 to a set of transaction marker lists 270 comprising one or more transaction marker lists 270, and/or populate a set of transaction marker lists 270 with transaction markers 273.

Figure 3:
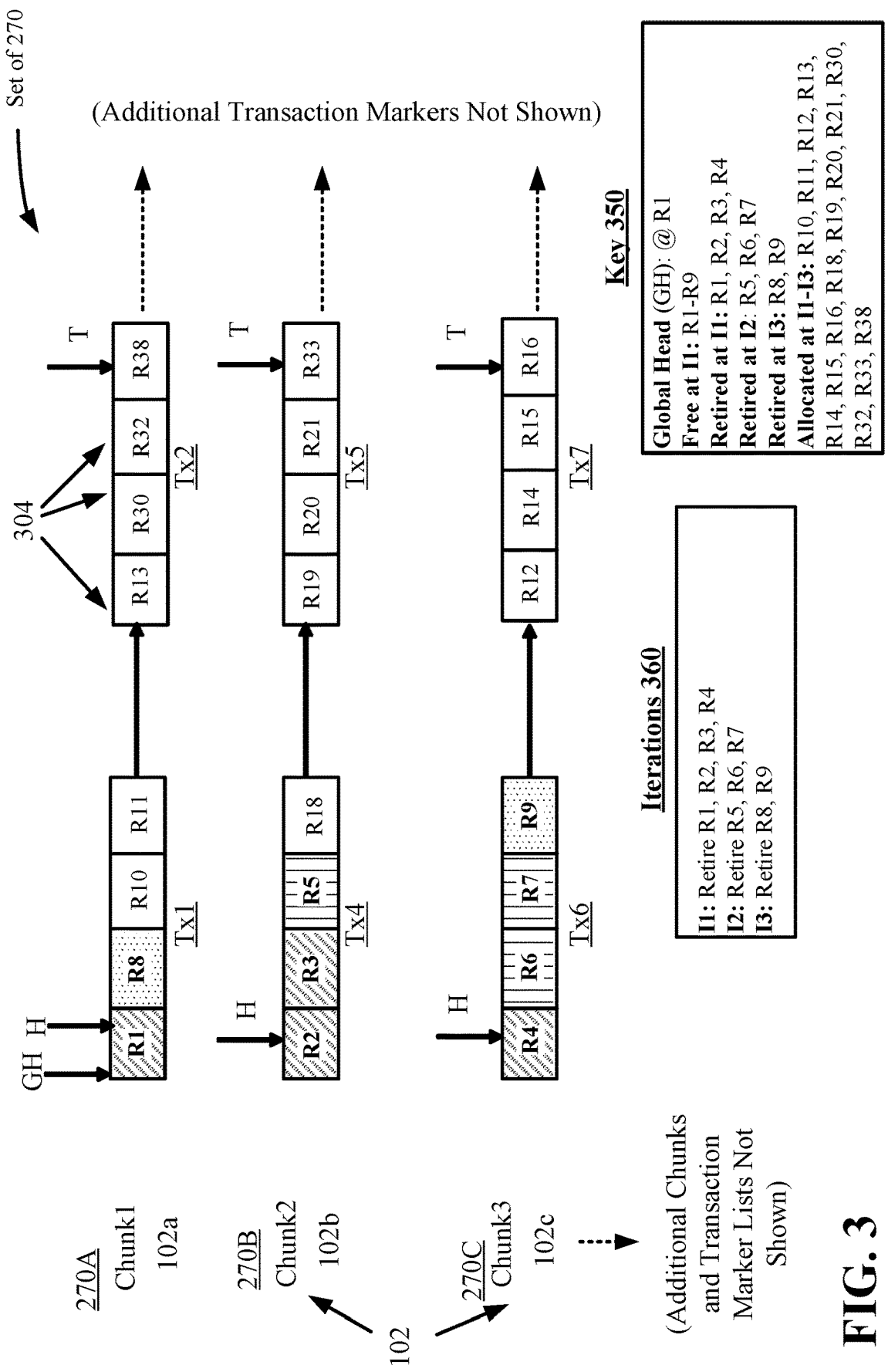
FIG. 3 illustrates a block diagram of a transaction marker list employed by the logging system of FIG. 2 to track transaction markers representing transaction log entries, in accordance with one or more embodiments and/or implementations described herein.

Referring first to the set of transaction marker lists 270 of FIGS. 2 and 3, this set of transaction marker lists 270 can be generated by the list evaluating component 218 (e.g., at step 404B) in connection with the journalling of the transactions 104 to the storage log 100. That is, the set of transaction marker lists 270 provides a succinct representation of the transaction log entries 253. The set of transaction marker lists 270 and/or the transaction markers 273 can be stored at the memory 206 or any other suitable location of the computing device 201.

For example, turning briefly to FIG. 3, the transaction markers 273 can be populated in an ordered sequence individually corresponding to transaction log entries 253 of a set of transactions 104 journaled to the multiple chunks 102 of the storage log 100. As such, in one or more embodiments, the transaction markers 273 can correspond to the transaction log entries 253 on a 1-to-1 basis. The transaction markers 273 can be identified by sequence numbers (e.g., R1, R2, R3, R4, etc.) according to the ordered sequence.

Further, the transaction markers 273 can be assigned to a particular set of transaction marker lists 270A, 270B, 270C and so on representing the chunk 102 of the multiple chunks to which the corresponding transaction log entries 253 were journalled. That is, as illustrated at FIG. 3, each transaction marker lists 270 corresponds on a 1-to-1 basis to a chunk 102 of the storage log 100.

In one or more other embodiments, a set of transaction marker lists 270 can correspond to two or more chunks 102, such as where the set of transaction marker lists 270 has segregated and identifiable portions that each separately correspond to a separate chunk 102 (e.g., on a 1-to-1 basis).

In one or more embodiments, the transaction markers 273 can comprise marker metadata 274 that can be stored at one or more list storage objects 272.

It will be appreciated that the set of transaction marker lists 270 can be initially generated in association with the journalling.

It will be appreciated that the steps 402, 404A, 404B and 404C can be performed in any suitable order and/or at least partially at the same time as one another.

Referring still to FIGS. 2 and 4, discussion next turns to the synchronizing component 216 and to the synchronization of the memory buffers 260 (e.g., to the synchronization of the modified system metadata 251 corresponding to the memory buffers 260) to the persistent storage 250 at step 405.

In one or more embodiments, the persistent storage 250 can be at least partially external to the file system 290.

For example, at sub-step 405*a*, the synchronizing component 216 can execute a write action to write modified system metadata 251 corresponding to a selected set of transaction 104 to the persistent storage 250. In one or more embodiments, the synchronizing of the modified system metadata 251 to the persistent storage can be executed at selected intervals that are not associated with a series of iterations of evaluating of the set of transaction marker lists 270, as will be described in detail below. Such selected intervals can be controlled by the synchronizing component 216, for example based on a speed of writing, available CPU bandwidth, how long modified system metadata 251 is in memory, amount of memory consumed by the modified system metadata 251, etc.

In one or more embodiments, the synchronizing of the modified system metadata 251 to the persistent storage 250 (e.g., for the transaction log entries 253 corresponding to the selected set of transactions 104) can begin where the usable log space threshold has not been satisfied. As used herein, the term "satisfied" can be below, above and/or equal to depending on the threshold. In one or more other embodiments, the synchronizing of the modified system metadata 251 to the persistent storage 250 can be held (e.g., not started) until satisfying such threshold.

Figure 5:
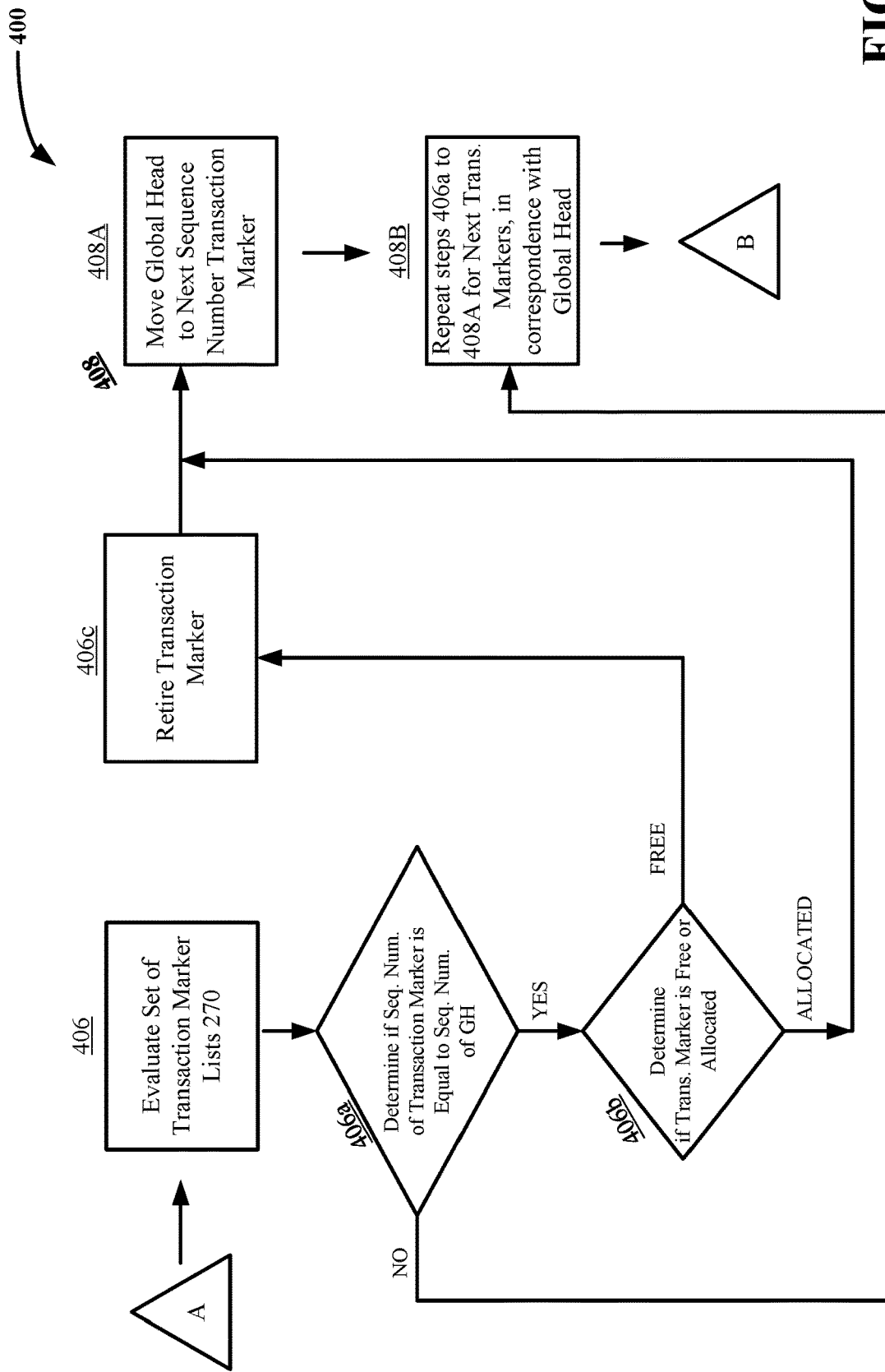
FIG. 5 illustrates a block diagram of another portion of operations that can be performed by the logging system of FIG. 2, in accordance with one or more embodiments and/or implementations described herein.

Discussion next turns to FIGS. 3 and 5 and to evaluating of the set of set of transaction marker lists 270 at step 406*a* by the list evaluating component 218.

A sample of the set of transaction marker lists 270 is illustrated at FIG. 3. The illustrated set of transaction marker lists 270 comprises at least three transaction marker lists 270A, 270B and 270C separately representing the chunks 102*a*, 102*b* and 102*c*. The transaction marker lists 270A, 270B and 270C comprise the transaction markers 273 (e.g., boxed R1, R8, etc.) of a plurality of transaction log entries 253 of the selected set of transactions 104. As illustrated, the transaction markers 273 are assigned according to the chunks 102 (e.g., 102*a*, 102*b*, 103*c*) at which the corresponding transaction log entries 253 are journalled. As noted at the illustration of the FIG. 3, additional transaction markers 273 can extend from Tx2, Tx5 and Tx7, although not shown, and additional chunks 102/transaction marker lists 270 can be included in the set of transaction marker lists 270, beyond chunk3 102*c*, although not shown.

For purposes of the illustration of FIG. 3, a global head GH of the set of transaction marker lists 270 and heads H and tails T of the individual chunks 102 are shown, and this information also is represented at or in correspondence with the set of set of transaction marker lists 270. A global tail GT is off page.

For ease of reference, at FIG. 3, the different transaction markers 273 (also known as transaction records) are labeled as being free or allocated. This notation is to be determined by the list evaluating component 218, as will be explained below.

Referring now to plural iterations of evaluating of the transaction markers 273 of the set of transaction marker lists 270 that are performed by the list evaluating component 218, these iterations (e.g., the completion of each iteration) are employed as gates in the overall data storage process (e.g., from storage log 100 to persistent storage 250) to allow for, indirectly or directly, approval to clear portions of the log space of the storage log 100 in correspondence with the synchronization of the modified system metadata being performed according to separate and distinct intervals (e.g., unassociated with the iterations).

Turning back to the illustration at FIG. 3, withdrawal of log holds 180, retirement of transaction markers 273 from the set of transaction marker lists 270, release of log storage objects 252, and moving of the global head GH and heads H of the chunks 102 can be triggered using the set of transaction marker lists 270 and the list evaluating component 218. In particular, the global head GH and each chunk head H can be moved forward when they are equal and the modified system metadata of a transaction marker 273 is on persistent storage 250.

That is, in response to completion of individual iterations of the evaluating of the set of transaction marker lists 270 by the list evaluating component 218, portions of transaction entry metadata 254 can be released and log space re-used as the overall data storage process (e.g., from storage log 100 to persistent storage 250) continues. In this way, in an undesired case of a system crash, issue, error and/or the like, modified system metadata can be regenerated (e.g., by the replay component 222) without gaps in the modified system metadata. That is, the transaction marker list evaluations can allow for consistency of data to be maintained, while the log holds can provide a corresponding holding mechanism to prevent clearing or overwriting of transaction entry metadata.

It is appreciated that in one or more embodiments, upon clearing of log space, such same log space can be immediately re-used for journalling of transactions corresponding to another set of transactions other than the selected set of transactions 104.

Discussion now turns to further description of steps 406 to 412 at FIG. 5, with continued reference to the set of transaction marker lists 270 of FIG. 3.

For example, an iteration of evaluating by the list evaluating component 218 can start at the respective global head GH as represented at the set of transaction marker lists 270. Each respective evaluation iteration can evaluate one or more transaction markers 273 at one or more chunks 102, such as each chunk 102, that correspond to the selected set of transactions 104.

For example, as illustrated at FIG. 3, an exemplary first iteration I1 of iterations 360 can comprise evaluation of the set of transaction marker lists 270 corresponding to the chunks 1, 2 and 3 (and other chunks 102 if present).

Briefly, the evaluating comprises evaluating transaction markers 273 at the heads of the chunks 102 (as represented at the set of transaction marker lists 270) and continuing to evaluate at each chunk 102 in a sequential order of the transaction markers 273 populated at each chunk 102, in correspondence with moving of the global head GH. This evaluating can continue until there are no further transaction markers 273 that can be determined as both free (e.g., corresponding to synchronized modified system metadata 251 and able to be retired (e.g., where all lower sequence number transaction markers have already been retired).

To achieve the evaluation at step 406, a pair of determinations can be made in coordination with the positioning of the global head GH. That is, at each evaluation step 406/iteration, the evaluating by the list evaluating component 218 follows the global head GH.

A first determination at sub-step 406*a*, by the list evaluating component 218, can start always with a transaction marker 273 having a sequence number being equal to a head H at a respective chunk 102 represented at the set of transaction marker lists 270. The list evaluating component 218 can determine whether the transaction marker 273 at the head H is also equal to the global head GH and/or otherwise identified by the global head GH. That is, the sequence number of the transaction marker 273 of a chunk 102 being analyzed can be compared with the global head sequence number. The sequence number of the transaction marker 273 being evaluated must be equal to the global head transaction sequence number.

If the sequence number of the transaction marker 273 being evaluated is equal to the global head transaction sequence number, the set 400 of operations can proceed to the sub-step 406b. If the sequence number of the transaction marker 273 being evaluated is not equal to the global head transaction sequence number, the set 400 of operations can proceed to the step 408 and particularly to sub-step 408B.

It is noted that as a result of sub-step 406a, it is indirectly verified that the transaction marker 273 at the global head GH (e.g., or otherwise referenced by the global head GH) has a sequence number such that all transaction markers 273 having lower sequence numbers than the particular transaction marker also have been retired. In this way, modified system metadata 251 corresponding to these lower sequence number transaction markers will have already been synchronized to the persistent storage 250. That is, the second determination can be made based only on a record maintained in association with the global head GH of location of the global head GH along the sequence order. Any determination of dependency among transactions 104 (e.g., dependencies 150), or of whether modified system metadata 251 corresponding to those lower sequence transaction markers has been synchronized, can be omitted.

Also in this way, a transaction log entry 253 referenced by a free transaction marker 273 that has a dependency upon one or more other transaction markers 273 corresponding to modified system metadata 251 not yet synchronized can be maintained, e.g., not cleared and the transaction marker 273 not retired. Accordingly, this third determination can allow for maintaining consistency of change to a file system in the case of a system issue, crash, etc.

That is, indirectly, if the transaction markers 273 all having lower sequence numbers than a sequence number of the transaction marker 273 being evaluated have been retired, then the transaction marker 273 being evaluated also can be retired.

Next, a second determination at sub-step 406b can determine if a particular transaction marker corresponds to modified system metadata 251 having been already synchronized to the persistent storage 250.

For example, the determination at sub-step 406b can comprise determining, by the list evaluating component 218, if a transaction marker 273 at the global head GH is free or allocated, and thus if the modified system metadata 251 corresponding thereto has been synchronized (e.g., by the synchronizing component 216) to the persistent storage 250. For example, the list evaluating component 218 can communicate with one or more other components of the logging system 202 (e.g., the synchronizing component 216), perform a query relative to the persistent storage 250, and/or perform any other suitable action to make the determination of whether or not a transaction marker 273 is free or allocated.

If a transaction marker 273 references a transaction log entry 253 corresponding to a memory buffer 260/modified system metadata 251 that has already been synchronized to the persistent storage 250, the transaction marker 273 can be marked and/or otherwise identified as free by the list evaluating component 218. This marking or identification at sub-step 406b can be executed at the set of transaction marker lists 270, and/or external to the set of transaction marker lists 270, such as using a reference number of 0 or 1. In response thereto, the set 400 of operations can proceed to the sub-step 406c.

Alternatively, if a transaction marker 273 references a transaction log entry 253 corresponding to a memory buffer 260/modified system metadata 251 that has not yet been synchronized to the persistent storage 250, the transaction marker 273 can be marked and/or otherwise identified as allocated by the list evaluating component 218. Again, this marking or identification at sub-step 406b can be executed at the set of transaction marker lists 270, and/or external to the set of transaction marker lists 270, such as using a reference number of 0 or 1. In response thereto, the set 400 of operations can proceed to the sub-step 408A.

At and/or in association with sub-step 406b, the transaction marker 273 can be retired from the set of transaction marker lists 270, such as be the retiring component 219. In this way, the transaction marker 273 being evaluated can be removed from the set of transaction marker lists 270, such as a list storage object 272 corresponding thereto being cleared. The set 400 of operations would then proceed to the sub-step 408A.

Discussion turns next to step 408 and sub-steps 408A and 408B.

At sub-step 408A, the global head GH can be moved to a next sequence number transaction marker 273 (e.g., to the transaction marker 273 at a head of a chunk 102 having the next sequence number of the ordered sequence as compared to the sequence number of the transaction marker having just been evaluated). This movement (e.g., in association with the evaluation of the GH with transaction markers at the head of other transaction marker lists/chunks) can be performed by the resetting component 220. In connection with the sub-step 408A, a record associated with the global head GH can be updated such as to record that a particular sequence number transaction marker 273 was identified as retireable and/or was retired.

At sub-step 408B, steps 406a to 408A can be repeated for additional transaction markers 273 in correspondence with the global head GH, for continuation of the individual iteration of the evaluating by the list evaluating component 218. That is, steps 406a to 408A are continually repeated (e.g., step 408B) for next transaction markers 273 until all transaction marker lists 270 of the set of transaction marker lists 270 have been evaluated (e.g., until all reference chunks 102 have been evaluated).

The proceeding at sub-step 408A by the list evaluating component 218 can proceed in a variety of different manners, each of which can be suitable, until all referenced chunks have been evaluated, thus ending the respective iteration of evaluation of the transaction markers 273.

According to a first manner, the evaluating can proceed in an order corresponding to chunk reference numbers (e.g., chunk 1, then chunk 2, then chunk 3). That is, the first chunk 1 can first be evaluated. At the first chunk 1, the transaction marker 273 at the head H is first evaluated. If that transaction marker 273 is retired, the head H at that chunk 102 is moved to the next sequential transaction marker 273 at that chunk 102, and so on and so forth. Upon a determination that a transaction marker 273 at a chunk 102 is not to be retired, the evaluating can proceed to the next chunk 2, and then chunk 3, and so on and so forth until all chunks have been evaluated. This would complete a single iteration.

According to a second manner, the evaluating can proceed in the order corresponding to the chunk reference numbers, as set forth above relative to the first manner, and subsequently, can return to one or more chunks where no transaction marker 273 was retired or where an amount of transaction markers 273 equal to a transaction marker threshold (e.g., referencing a quantity of transaction markers 273) was not satisfied. This would complete a single iteration.

According to a third manner, the evaluating can proceed continually cycling through the chunks, in the sequential order or another sequential order, until all transaction markers have been retired or until a transaction marker threshold (e.g., referencing a quantity of transaction marks 273) has been satisfied. This would complete a single iteration.

It is appreciated that the transaction marker threshold of the second and/or third manner can additionally and/or alternatively be defined according to time, bandwidth, memory and/or the like.

It is appreciated that in response to the identifying of a transaction marker 273 as being not at the global head GH, allocated, and/or not retireable by the list evaluating component 218, in one or more embodiments, the list evaluating component 218 can continue to identify subsequent transaction markers 273 at a represented chunk as being free or allocated. In this way, an indication of one or more transaction markers 273 as being free can be stored from one evaluating iteration and used at a subsequent evaluating iteration absent re-determination for that one or more transaction markers 273 identified as free.

It is appreciated that in one or more embodiments, at any one or more transaction marker evaluation iterations, two or more of the determinations at sub-steps 406*a* and 406*b* can be performed at least partially at the same time as one another for a same transaction marker 273.

It is appreciated that in one or more embodiments, substep 406*b* can be performed for two or more transaction markers 273 at a same chunk 102 at least partially at a same time as one another.

It is appreciated that one or more intervals of synchronizing of the modified system metadata 251 can continue to be executed by the synchronizing component 216 during any evaluating iteration by the list evaluating component 218. As a result, new transaction markers 273 can be identified at each subsequent evaluating iteration as being free or available to be allocated, that were previously otherwise identified as allocated or free but were not available to be allocated.

It is appreciated that if no transaction markers 273 remain at a chunk 102 represented at the set of transaction marker lists 270, that respective transaction marker list 270 can be skipped in an iteration (e.g., evaluation of that respective transaction marker list 270 can be omitted).

Discussion turns now to specific examples of steps 406 to 408 in use, as illustrated at the set of transaction marker lists 270 illustration at FIG. 3.

A first iteration I1, as will be explained, can comprise a determination that transaction markers R1, R2, R3 and R4 (also herein referred to as transaction records, and thus the "R" of "R1") are free and retireable. Also, one or more transaction markers 273, such as transaction markers R6, R7 and R8, can be identified as free at the first iteration I1. Further, one or more transaction markers 273, such as transaction markers R10 and R11, can be identified as being allocated at the first iteration I1.

For example, according to the first manner, the list evaluating component 218 can start at the head of the represented chunk 1 and make the determination that the global head GH aligns with the transaction marker R1. The list evaluating component 218 make a determination of free/allocated for transaction marker R1. That is, the list evaluating component 218 can communicate with one or more other components of the logging system 202 (e.g., the synchronizing component 216), perform a query relative to the persistent storage 250, and/or perform any other suitable action to make the determination of whether or not a transaction marker 273 is free or allocated, without being limited only thereto. Because the transaction marker R1 corresponds to modified system metadata 251 having been already synchronized, the transaction marker R1 can be marked and/or otherwise identified as free.

Where the transaction marker R1 is identified as free, the list evaluating component 218 can indirectly determine if all transaction markers 273 having lower sequence numbers than R1 have been retired. Because the transaction marker R1 is the first transaction marker, the determination at sub-steps 406*a* and 406*b* succeed and the transaction marker R1 can be marked as retireable and/or retired by the retiring component 219.

In response thereto, the head at chunk 1 is moved to the transaction marker R8 and the global head GH is moved to the transaction marker R2.

The sequentially next (e.g., next downstream) transaction marker 273 at the represented chunk 1 can be evaluated, which transaction marker is R8. Because the transaction marker R8 corresponds to modified system metadata 251 that has been synchronized, but the global head GH is not equal to the transaction marker R8, the transaction marker R8 cannot be marked and/or otherwise identified as being retireable.

The list evaluating component 218 can proceed to stop the evaluating of the transaction markers 273 at the represented chunk 1.

This same list evaluating can proceed at the other represented chunks 2, 3, etc. based on the same first manner of evaluating discussed above.

For example, relative to chunk 2, transaction markers R2 and R3 can be identified as free due to corresponding to synchronized modified system metadata 251 and individually to the global head GH. That is, once the transaction marker R2 is retired, the global head GH will move to the transaction marker R3.

Further, also relative to chunk 2, transaction marker R5 can be identified as not retireable because the global head GH will have moved to the transaction marker R4.

Following the first manner, the transaction marker R4 can be identified as free and retireable due to being equal to the global head GH. Transaction marker R6 can be identified as not retireable because the global head GH will have moved to the transaction marker R5.

Turning to a second iteration I2 of evaluating according to the first manner, the list evaluating component 218 can determine that the transaction marker R8 at chunk 1 is not equal to the global head GH, even though the transaction marker R8 is free. As chunk 2, the transaction marker R5 can be retired, and at chunk 3, the transaction markers R6 and R7 can be sequentially retired in that order.

Turning to a third iteration I3 of evaluating according to the first manner, the transaction markers R8 and R9 can be sequentially retired in that order.

It is noted that if proceeding according to the second manner, for example, after evaluating all represented chunks at iteration I2, the list evaluating component 218 could proceed back to chunk 1 where no transaction marker was retired and could retire the transaction marker R8 (being equal to the global head GH after retirement of the transaction marker R7).

The above examples complete the iterations 360 of I1, I2 and I3. Further examples or summary of one or more of the above examples can be reasoned by one having ordinary skill in the art based on the key 350 at FIG. 3.

Figure 6:
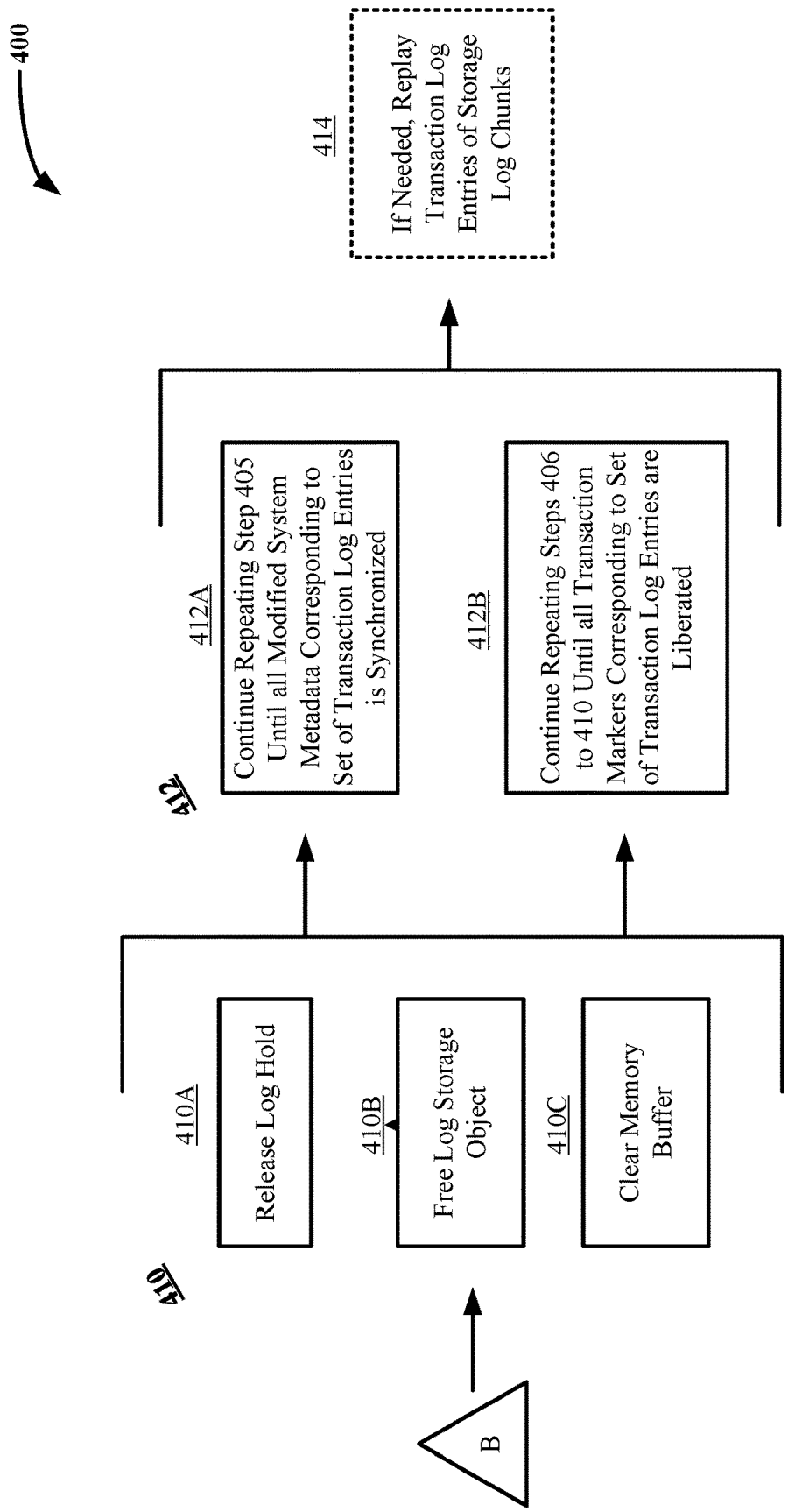
FIG. 6 illustrates a block diagram of still another portion of operations that can be performed by the logging system of FIG. 2, in accordance with one or more embodiments and/or implementations described herein.

Discussion turns next to FIG. 6 and to a set of one or more reconciliation steps 410 (e.g., steps 410A-C) corresponding to transaction markers 273 having been retired by the retiring component 219 at each iteration of evaluating. These reconciliation steps 410 can be performed by the log hold component 212 and/or resetting component 220.

That is, in response to the retirement of a transaction marker 273, the log hold component 212 can release one or more log holds 180 of the set of log holds that correspond to the memory buffers 260, which correspond to the transaction markers 273 (e.g., at step 410A). That is, metadata representing the log holds 180 can be cleared. In one or more embodiments, the release can be a lazy release.

In association with the release of the log holds 180, the resetting component 220 can clear (e.g., free) the log storage objects 252 comprising the transaction log entries 253 corresponding to the memory buffers 260 that correspond to the retired transaction marker 273 (e.g., at step 410B). In this way, in the case of a file system or computing device issue, the file system can be maintained as consistent after the update of the file system 290 (e.g., by way of synchronization of the modified system metadata 251).

At step 410C, the memory buffers 260 corresponding to retired transaction marker 273 can be cleared of any modified system metadata 251, such as by the resetting component 220.

It is appreciated that any one or more of steps 410A-C can be performed at the same time as one another.

It is appreciated that any one or more of steps 410A-C can be performed for more than one retireable transaction marker 273 at a same time as one another. For example, in connection with the end of an iteration of evaluating of the set of transaction marker lists 270, the reconciliation steps 410A-C can be performed for all transaction markers 273 marked as retireable during that previous iteration, such as in bulk. In this way, a number of reconciliation iterations can be reduced, as compared to reconciliating each retired transaction marker 273 separately. As used herein, the term "in bulk" can mean at a same time as one another, at least partially in parallel with one another, in sequence but within a given time period, each within a time of one another, etc.

Next, at step 412A, as noted above, the synchronizing step 405 can be repeated until all modified system metadata 251 corresponding to the transaction log entries 253 that correspond to the selected set of transactions 104 has been synchronized.

At step 412B, list evaluating step 406, identification steps 408 and reconciliation steps 410 can be repeated until all transaction markers 273 corresponding to the transaction log entries 253 across all chunks 102 that correspond to the selected set of transactions 104 have been marked as retireable and then retired. Likewise, the repeating is performed until the global head GH is set equal to the global tail GT.

Discussion next turns to step 414 and to the benefit of use of the log holds 180 in the case of a crash, failure, and/or other issue with the computing device 201, associated file system 290, and/or logging system 202. This discussion can be relevant to access to the transaction log entries 253 at any point during an iteration of storage log use and subsequent metadata synchronization, as signified by the use of the dotted-line box surrounding step 414. That is, discussion regarding step 414 is not just relevant to any one point in such iteration. That is, step 414 can be performed out of the order of the set 400 of operations.

As discussed above, to ensure that, in the case of a file system or computing device issue, the file system metadata is consistent before the update of the file system 290, the set of log holds 180 corresponding to the selected set of transactions 104 can allow for maintaining transaction log entries 253 of the transactions 104 written to the storage log 100, without the storage log space defining the storage log 100 being preemptively cleared. As such, modified system metadata 251 not yet synchronized is able to be regenerated if needed, such as by replaying the transaction log entries 253.

At step 414, the logging system 202, and particularly the log hold component 212, can maintain the set of log holds 180, which correspond to the set of memory buffers 260, which in turn correspond to the selected set of transactions 104, until all dirty memory buffers 260 that correspond to the selected set of transactions 104 have been synchronized to the persistent storage 250. That is, the logging system 202 can prevent the reuse of the log space of the storage log 100 until writing of the modified system metadata 251 corresponding to all transaction log entries 253 of the selected set of transactions 104, has been executed.

For example, in the case of a system issue, at the request of an entity, and/or for any other suitable reason, in response to determining that not all (e.g., less than all) of the memory buffers 260 are synchronized, the replay component 222 can scan at least a subset of the transaction log entries 253 that have been journalled to, and not yet released from, the storage log 100, such as in a sequential order of the subset of the transaction log entries 253, due to the maintaining of the set of log holds 180.

In this way, a crash or other issue can be remediated. Put another way, in response to all modified system metadata 251 corresponding to all transaction log entries 253 of the selected set of transactions 104 being determined not to have been written yet, the replay component 222 can scan at least a subset of the transaction log entries 253 that have been journalled to, and not yet released from, the storage log 100, such as in a sequential order of the subset of the transaction log entries 253, due to the preventing of the reuse of the log space.

Example Operations

Figure 7:
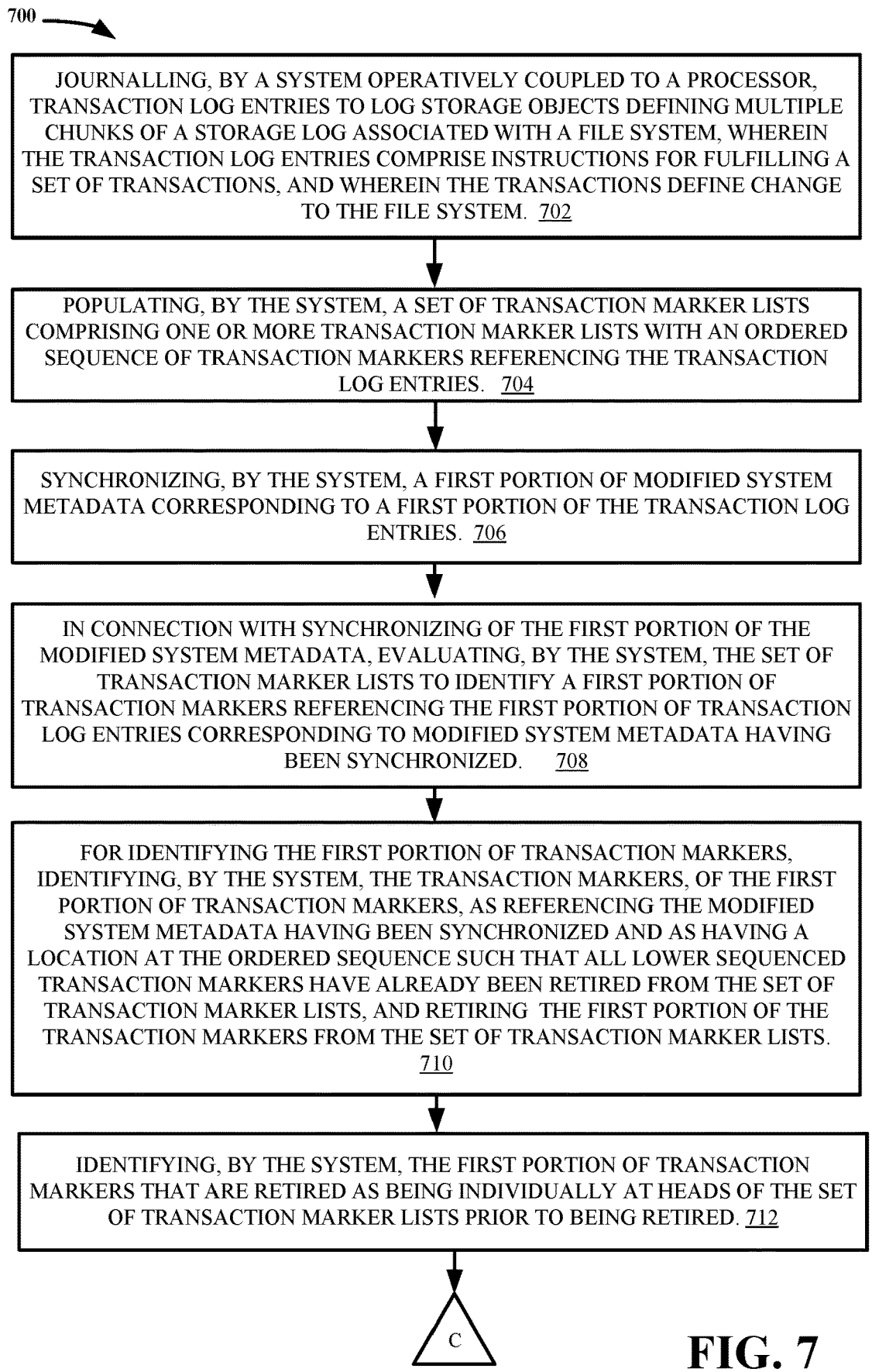
FIG. 7 illustrates a process flow diagram of a method of tracking of synchronizing of modified system metadata to persistent storage and of subsequent clearing of storage log space, in accordance with one or more embodiments and/or implementations described herein.
Figure 8:
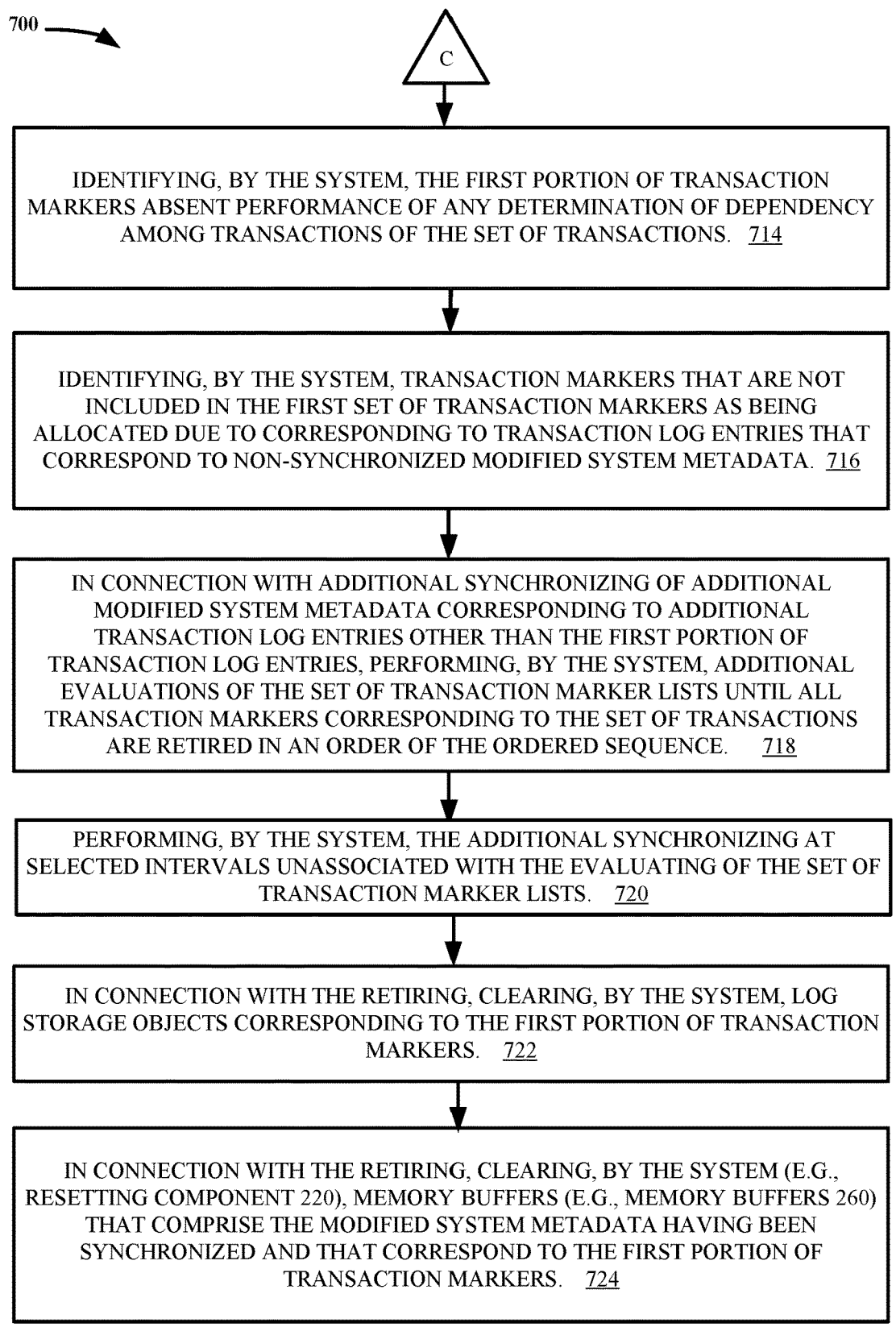
FIG. 8 illustrates a continuation of the process flow diagram of FIG. 7 of a method of tracking of synchronizing of modified system metadata to persistent storage and of subsequent clearing of storage log space, in accordance with one or more embodiments and/or implementations described herein.

Turning now to FIGS. 7 and 8, a process flow comprising a set of operations for providing for tracking of transaction entry metadata during synchronizing of the modified system metadata to persistent storage is set forth relative to FIGS. 1-6. One or more elements, objects and/or components referenced in the process flow 700 can be those of schematics 100-600. Repetitive description of like elements and/or processes employed in previously described embodiments is omitted for sake of brevity.

At operation 702, the process flow 700 can comprise journalling, by a system operatively coupled to a processor (e.g., transaction journalling component 210), transaction log entries (e.g., transaction log entries 253) to log storage objects (e.g., log storage objects 252) defining multiple chunks (e.g., chunks 102) of a storage log (e.g., storage log 100) associated with a file system (e.g., file system 290), wherein the transaction log entries comprise instructions for fulfilling a set of transactions (e.g., transactions 104), and wherein the transactions define change to the file system.

At operation 704, the process flow 700 can comprise populating, by the system (e.g., listing component 214), one or more transaction marker lists (e.g., set of transaction marker lists 270) with an ordered sequence of transaction markers (e.g., transaction markers 273) referencing the transaction log entries.

At operation 706, the process flow 700 can comprise synchronizing, by the system (e.g., synchronizing component 216), a first portion of modified system metadata (e.g., modified system metadata 251) corresponding to a first portion of the transaction log entries.

At operation 708, the process flow 700 can comprise, in connection with synchronizing of the first portion of the modified system metadata, evaluating, by the system (e.g., list evaluating component 218), the set of transaction marker lists to identify one or more transaction markers referencing the first portion of the transaction log entries.

At operation 710, the process flow 700 can comprise, for identifying the first portion of transaction markers, identifying, by the system (e.g., list evaluating component 218), the transaction markers, of the first portion of transaction markers, as referencing the modified system metadata having been synchronized and as having a location at the ordered sequence such that all lower sequenced transaction markers have already been retired from the set of transaction marker lists, and retiring (e.g., by the retiring component 219) the first portion of the transaction markers from the set of transaction marker lists.

At operation 712, the process flow 700 can comprise, identifying, by the system (e.g., list evaluating component 218), the first portion of transaction markers that are retired as being individually at heads of the set of transaction marker lists prior to being retired.

At operation 714, the process flow 700 can comprise identifying, by the system (e.g., list evaluating component 218), the first portion of transaction markers absent performance of any determination of dependency among transactions of the set of transactions.

At operation 716, the process flow 700 can comprise identifying, by the system (e.g., list evaluating component 218), transaction markers that are not included in the first set of transaction markers as being allocated due to corresponding to transaction log entries that correspond to non-synchronized modified system metadata.

At operation 718, the process flow 700 can comprise, in connection with additional synchronizing of additional modified system metadata corresponding to additional transaction log entries other than the first portion of transaction log entries, performing, by the system (e.g., list evaluating component 218), additional evaluations of the set of transaction marker lists until all transaction markers corresponding to the set of transactions are retired in an order of the ordered sequence.

At operation 720, the process flow 700 can comprise performing, by the system (e.g., synchronizing component 216), the additional synchronizing at selected intervals unassociated with the evaluating of the set of transaction marker lists.

At operation 722, the process flow 700 can comprise, in connection with the retiring, clearing, by the system (e.g., resetting component 220), log storage objects corresponding to the first portion of transaction markers.

At operation 724, the process flow 700 can comprise in connection with the retiring, clearing, by the system (e.g., resetting component 220), memory buffers (e.g., memory buffers 260) that comprise the modified system metadata having been synchronized and that correspond to the first portion of transaction markers.

Turning now to FIGS. 9 and 10, another process flow comprising a set of operations for providing for tracking of transaction entry metadata during synchronizing of the modified system metadata to persistent storage is set forth relative to FIGS. 1-6. One or more elements, objects and/or components referenced in the process flow 900 can be those of schematics 100-600. Repetitive description of like elements and/or processes employed in previously described embodiments is omitted for sake of brevity.

At operation 902, the process flow 900 can comprise storing, by a system operatively coupled to a processor (e.g., transaction journalling component 210), a set of transaction log entries (e.g., transaction log entries 253) at log space of a storage log (e.g., storage log 100) associated with a file system (e.g., file system 290), wherein the transaction log entries comprise instructions for fulfilling a set of transactions (e.g., transactions 104) that define change to the file system.

At operation 904, the process flow 900 can comprise assigning, by the system (e.g., list evaluating component 218), in an ordered sequence corresponding to a sequence order of journalling of the set of transaction log entries to the log space, transaction markers (e.g., transaction markers 273) to a set of transaction marker lists (e.g., set of transaction marker lists 270) comprising one or more transaction marker lists (e.g., transaction marker lists 270A, 270B, 270C), wherein the transaction markers reference the set of transaction log entries.

At operation 906, the process flow 900 can comprise employing, by the system (e.g., log hold component 212), a set of log holds (e.g., log holds 180) associated with a set of memory buffers (e.g., memory buffers 260) that comprise modified system metadata (e.g., modified system metadata 251), wherein respective ones of the log holds are maintained to prevent the reuse of the log space until the writing of modified system metadata corresponding to memory buffers of the set of memory buffers and corresponding to the respective ones of the log holds is written to a persistent storage (e.g., persistent storage 250), and further satisfies the evaluation of the set of transaction marker lists or another evaluation of the set of transaction marker lists.

At operation 908, the process flow 900 can comprise applying, by the system (e.g., log hold component 212), the log holds as corresponding on a 1-to-1 basis to log storage objects (e.g., log storage objects 252) of the log space to which the transaction log entries are journalled.

At operation 910, the process flow 900 can comprise, for individual transaction markers of the transaction markers, preventing, by the system (e.g., log hold component 212), reuse of the log space corresponding to the transaction marker until an evaluation of the set of transaction marker list results in a first determination that writing of all modified system metadata, corresponding to the transaction marker has been executed to persistent storage, and in a second determination that the transaction marker is set equal to a global head (e.g., global head GH) transitioning the transaction markers of the set of transaction marker lists in the sequence order.

At operation 912, the process flow 900 can comprise synchronizing, by the system (e.g., synchronizing component 216), the modified system metadata corresponding to the set of transaction log entries at selected intervals unassociated with the evaluation of the set of transaction marker lists or with additional evaluations of the set of transaction marker lists.

At operation 914, the process flow 900 can comprise, as a result of the evaluating of the set of transaction marker lists and as a result of the writing of the modified system metadata to the persistent storage, identifying, by the system (e.g., log hold component 212), the log space comprising the transaction log entries as being available to be released by the system.

At operation 916, the process flow 900 can comprise clearing, by the system (e.g., synchronizing component 216), the log space of transaction log entries of the set of transaction log entries at intervals directly associated with the evaluation of the set of transaction marker lists and with additional evaluations of the set of transaction marker lists.

Figure 12:
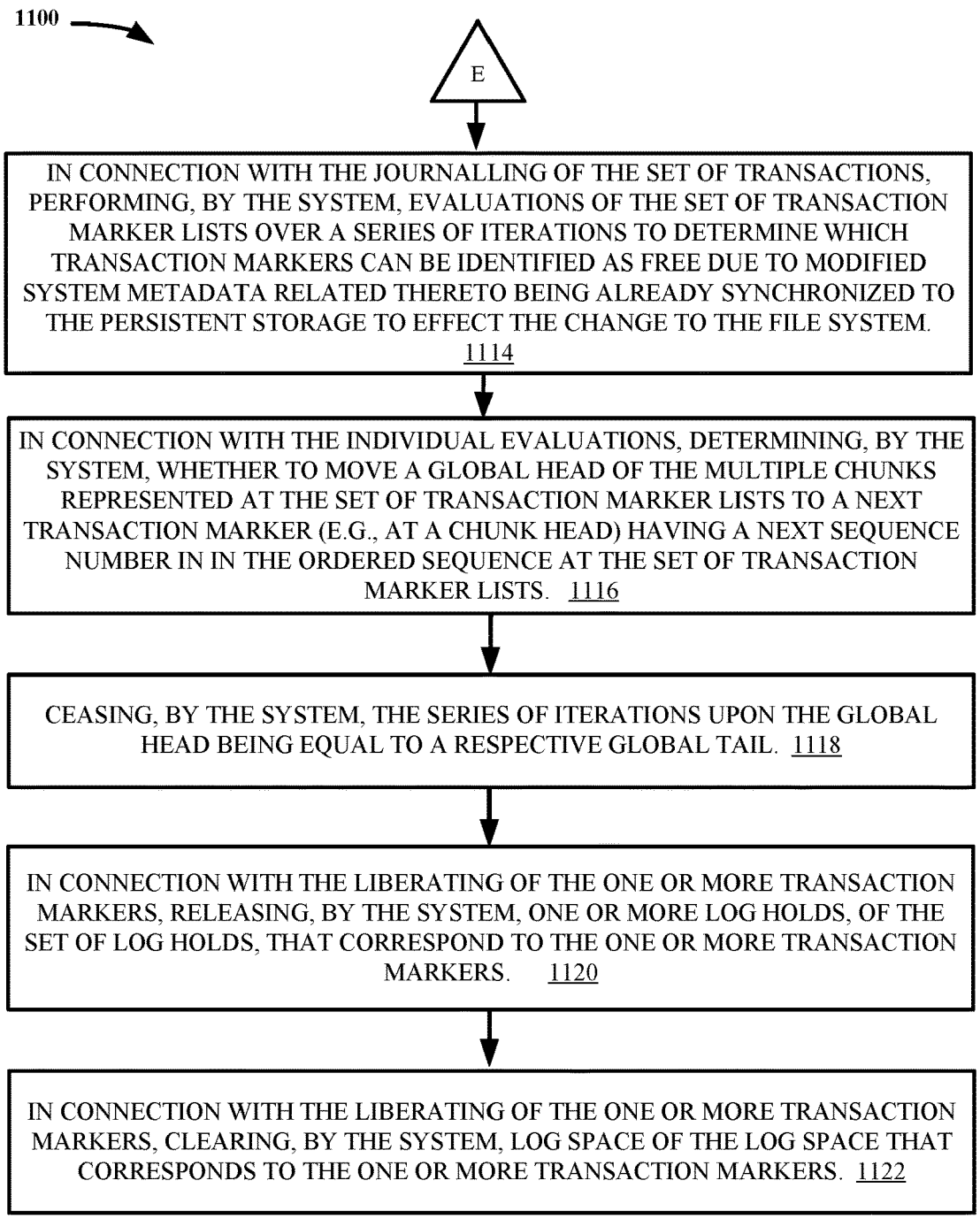
FIG. 12 illustrates a continuation of the process flow diagram of FIG. 11 of a method of tracking of synchronizing of modified system metadata to persistent storage and of subsequent clearing of storage log space, in accordance with one or more embodiments and/or implementations described herein.

Turning now to FIGS. 11 and 12, still another process flow comprising a set of operations for providing for tracking of transaction entry metadata during synchronizing of the modified system metadata to persistent storage is set forth relative to FIGS. 1-6. One or more elements, objects and/or components referenced in the process flow 1100 can be those of schematics 100-600. Repetitive description of like elements and/or processes employed in previously described embodiments is omitted for sake of brevity.

At operation 1102, the process flow 1100 can comprise populating, by a system operatively coupled to a processor (e.g., listing component 214), a set of transaction marker lists (e.g., set of transaction marker lists 270) comprising one or more transaction marker lists (e.g., transaction marker lists 270A, 270B, 270C) with an ordered sequence of transaction markers (e.g., transaction markers 273) individually corresponding to transaction log entries (e.g., transaction log entries 253) of a set of transactions (e.g., transactions 104) journalled to multiple chunks (e.g., chunks 102) of a log space for effecting change to a file system (e.g., file system 290).

At operation 1104, the process flow 1100 can comprise identifying, by the system (e.g., listing component 214), the transaction markers by sequence numbers according to the ordered sequence.

At operation 1106, the process flow 1100 can comprise modifying, by the system (e.g., transaction journalling component 210), memory buffers (e.g., memory buffers 260) to comprise modified system metadata (e.g., modified system metadata 251).

At operation 1108, the process flow 1100 can comprise synchronizing, by the system (e.g., synchronizing component 216), the modified system metadata to a persistent storage (e.g., persistent storage 250).

At operation 1110, the process flow 1100 can comprise performing the synchronizing, by the system (e.g., synchronizing component 216), of the modified system metadata at selected intervals unassociated with a series of iterations of evaluating of the set of transaction marker lists.

At operation 1112, the process flow 1100 can comprise, in connection with the populating of the transaction marker list, applying, by the system (e.g., listing component 214), a set of log holds (e.g., log holds 180) corresponding to storage log objects (e.g., log storage objects 252) at the multiple chunks.

At operation 1114, the process flow 1100 can comprise, in connection with the journalling of the set of transactions, performing, by the system (e.g., list evaluating component 218), evaluations of the set of transaction marker lists over the series of iterations to determine which transaction markers can be identified as free due to modified system metadata related thereto being already synchronized to the persistent storage to effect the change to the file system.

At operation 1116, the process flow 1100 can comprise, in connection with the individual evaluations, determining, by the system (e.g., list evaluating component 218), whether to move a global head (e.g., global head GH) of the multiple chunks represented at the set of transaction marker lists to a next transaction marker (e.g., at a chunk head) having a next sequence number in the ordered sequence at the set of transaction marker lists.

At operation 1118, the process flow 1100 can comprise ceasing, by the system (e.g., list evaluating component 218), the series of iterations upon the global head being equal to a respective global tail (e.g., global tail GT).

At operation 1120, the process flow 1100 can comprise, in connection with the retiring of the one or more transaction markers, releasing, by the system (e.g., resetting component 220), one or more log holds, of the set of log holds, that correspond to the one or more transaction markers.

At operation 1122, the process flow 1100 can comprise, in connection with the retiring of the one or more transaction markers, clearing, by the system (e.g., resetting component 220), log space of the log space that corresponds to the one or more transaction markers.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the figures provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, described is technology that facilitates journalling a transaction log entry to chunks of storage while allowing for obtaining of modified system metadata associated therewith in the case of a computing device issue. A method facilitating an update to a file system comprises storing a set of transaction log entries at log space of a storage log associated with the file system, the transaction log entries comprising instructions for fulfilling a set of transactions that define change to the file system, assigning, in an ordered sequence corresponding to a sequence order of journalling of the set of transaction log entries to the log space, transaction markers to a set of transaction marker lists, wherein the transaction markers reference the set of transaction log entries, and, for individual transaction markers of the transaction markers, preventing reuse of the log space corresponding thereto until an evaluation of the set of transaction marker lists results in a determination that writing of all modified system metadata corresponding thereto has been executed and that the transaction marker is set equal to a global head transitioning the transaction markers.

An example benefit of one or more of the above-indicated method, system and/or non-transitory computer-readable medium can be reduction in the number of validations of transaction metadata relative to existing approaches. For example, the one or more embodiments herein can employ a set of transaction marker lists, comprising one or more transaction marker lists, for referencing transactions being executed, wherein a set of iterations of evaluating of the set of transaction marker lists are performed to determine when to retire transaction markers from the set of transaction marker lists, and subsequently when to clear log space to which the transactions are journalled as transaction log entries.

This retirement can be performed in an ordered sequence based on transitioning of a global head along the transaction markers where the ordered sequence corresponds to an ordered sequence of the journalling of the transactions to the log space. Accordingly, transaction markers can be retired absent a check of any dependency among the transactions when synchronizing the modified system metadata, as is done in existing frameworks. In connection therewith, the synchronizing of modified system metadata, corresponding to the transactions and for effecting a change to a file system, can be performed in an order different from the ordered sequence. Additionally, the above-indicated method, system and/or non-transitory computer-readable medium can be more easily scaled, as compared to existing frameworks.

Another example benefit can be using a set of log holds and maintaining transaction entry metadata defining the transactions at corresponding log storage objects (e.g., defining the log). In connection therewith, order of writes to persistent storage can be omitted and the log chunks (also herein referred to as chunks) can be initially journalled, and subsequently memory buffers can be synchronized, in any suitable order, even at least partially in parallel with one another (e.g., at least partially concurrently with one another). Further, retirement of transaction markers and thus transactions can be completed in bulk. This is in contrast to existing frameworks where transaction metadata is cleared in specific order from the storage log upon synchronization.

Indeed, in view of the one or more embodiments described herein, a practical application of above-indicated method, system and/or non-transitory computer-readable medium can be an ability to employ limited validation when writing modified system metadata to persistent storage for updating a file system, which modified system metadata corresponds to one or more transaction log entries, thereby reducing validation costs as compared to existing approaches.

Furthermore, the one or more embodiments described herein can perform the synchronizing of modified system metadata corresponding to multiple chunks or corresponding to multiple logs without validating any transaction dependency constraints. That is, an order of writes of the modified system metadata to persistent storage can be omitted and the chunks can be initially journalled and subsequently synchronized in any suitable order, such as at least partially in parallel with one another. These are useful and practical applications of computers, thus providing enhanced (e.g., improved and/or optimized) operation of the hardware and/or software components for employing multiple log chunks or multiple logs for a same set of transactions involving a file system. Overall, such tools and/or approaches can constitute a concrete and tangible technical and/or physical improvement in the fields of log retirement transaction order monitoring and file system updates more generally.

Furthermore, one or more embodiments described herein can be employed in a real-world system based on the disclosed teachings. For example, one or more embodiments described herein can function with a computer system and/or one or more servers for internet, cloud and/or internal/external networks to perform log use and writing of data to persistent storage based on logged transaction entry metadata.

Further, one or more embodiments described herein are inherently and/or inextricably tied to computer technology and cannot be implemented outside of a computing environment. For example, one or more processes performed by one or more embodiments described herein can more efficiently, and even more feasibly, enable, monitor and/or track retirement order of transactions of a storage log of a computer system as compared to existing systems and/or techniques. Systems, computer-implemented methods and/or computer program products facilitating performance of these processes are of great utility in the field of computer storage logs and file system updates and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively operate processes that perform transaction log entry journalling, modified system metadata synchronizing, generation and application of log holds, and/or evaluating of one or more transaction marker lists referencing transaction log entries as the one or more embodiments described herein can facilitate these processes. And, neither can the human mind nor a human with pen and paper automatically perform one or more of the processes as conducted by one or more embodiments described herein.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not described herein for the sake of brevity, but known by those of skill in the art.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud operation systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 13:
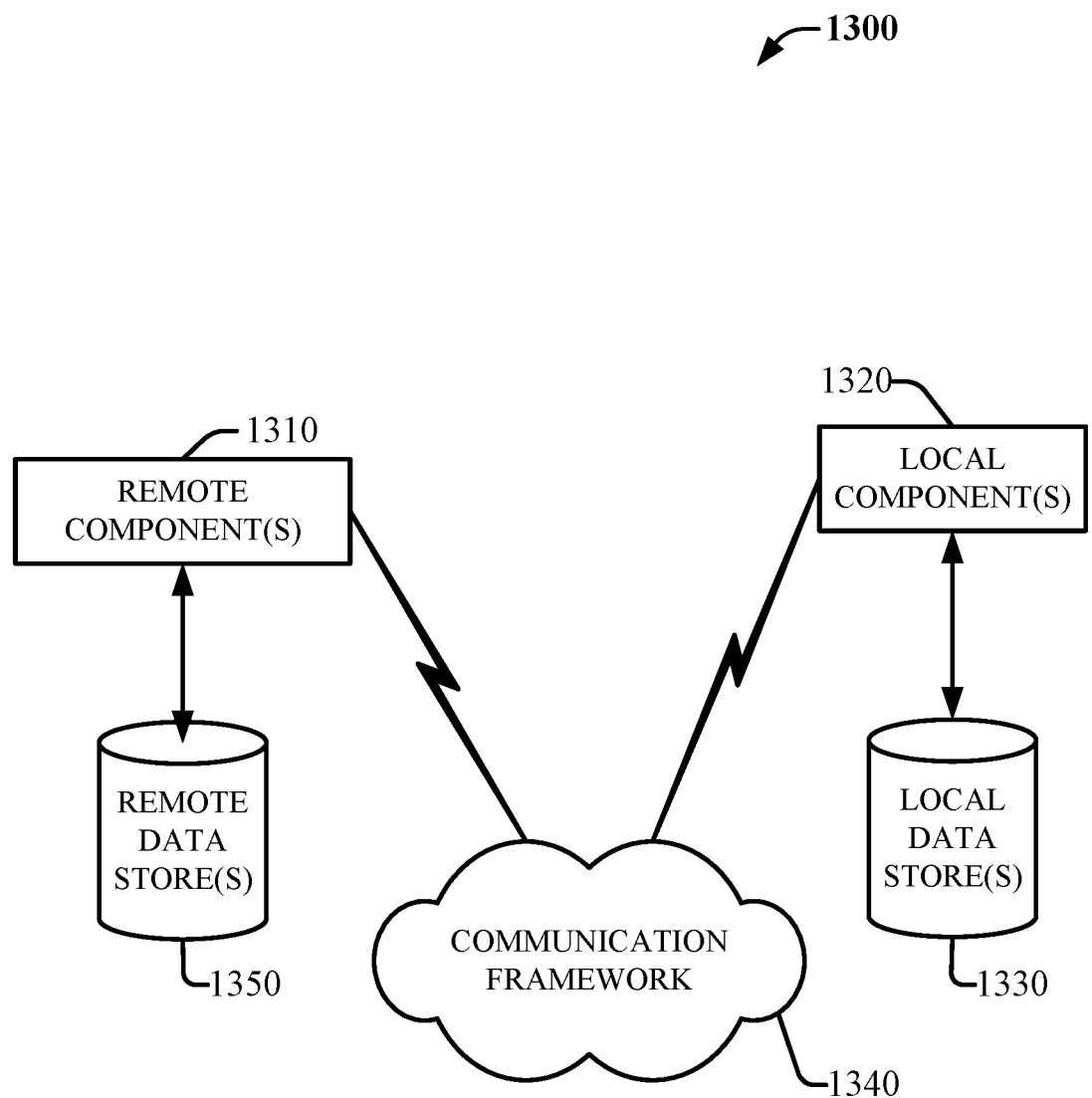
FIG. 13 illustrates a block diagram of an example operating environment into which embodiments of the subject matter described herein can be incorporated.

FIG. 13 is a schematic block diagram of an operating environment 1300 with which the described subject matter can interact. The operating environment 1300 comprises one or more remote component(s) 1310. The remote component(s) 1310 can be hardware and/or software (e.g., threads, processes, computing devices). In one or more embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The operating environment 1300 also comprises one or more local component(s) 1320. The local component(s) 1320 can be hardware and/or software (e.g., threads, processes, computing devices). In one or more embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The operating environment 1300 comprises a communication framework 1340 that can be employed to facilitate communications between the remote component(s) 1310 and the local component(s) 1320, and can comprise an air interface, e.g., interface of a UMTS network, via an LTE network, etc. Remote component(s) 1310 can be operably connected to one or more remote data store(s) 1350, such as a hard drive, solid state drive, subscriber identity module (SIM) card, electronic SIM (eSIM), device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Example Computing Environment

Figure 14:
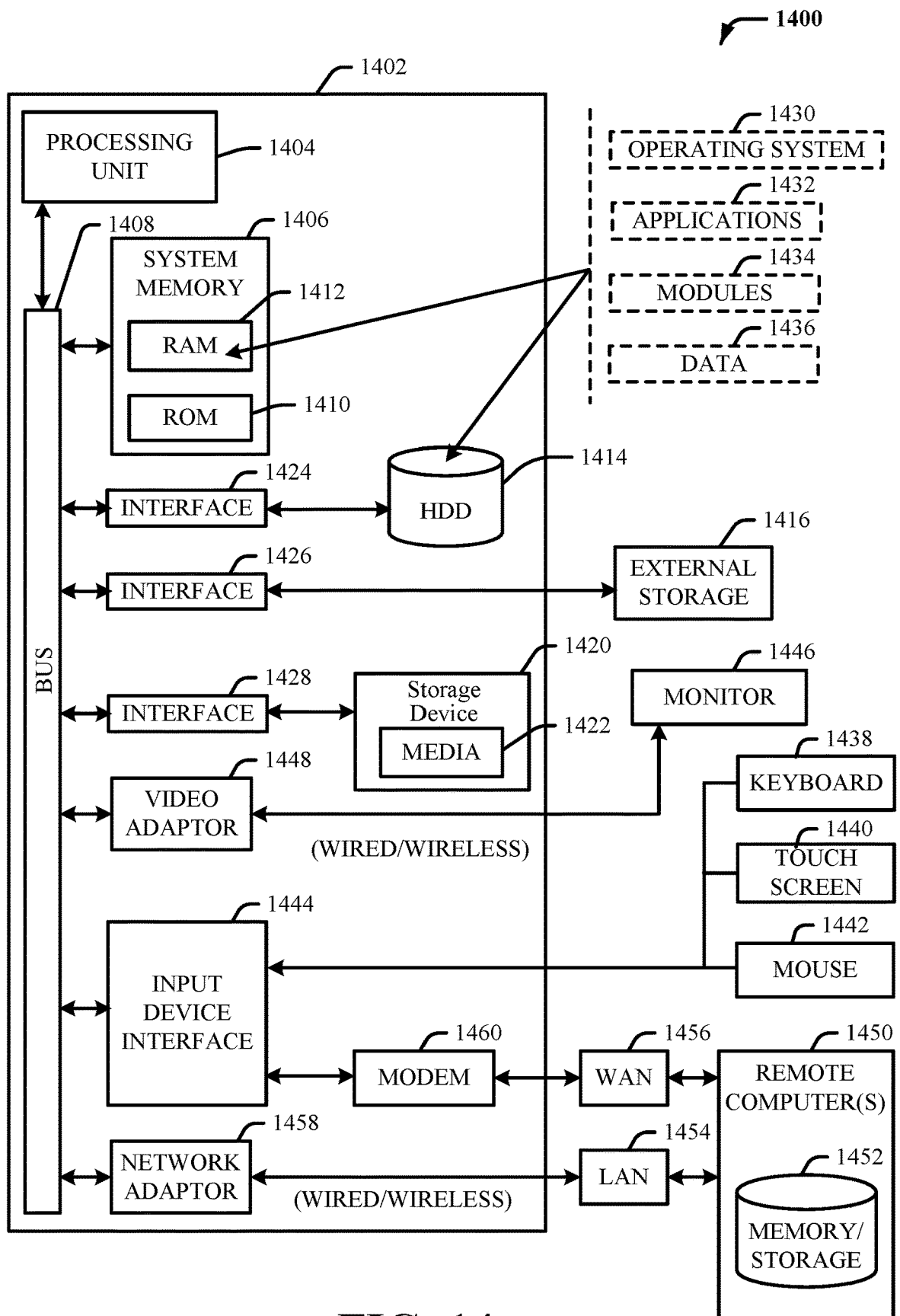
FIG. 14 illustrates an example schematic block diagram of a computing environment with which the subject matter described herein can interact and/or be implemented at least in part.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 14, the example computing environment 1400 which can implement one or more embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multiprocessor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in computing environment 1400, a solid-state drive (SSD) could be used in addition to, or in place of, an HDD 1414.

Other internal or external storage can include at least one other storage device 1420 with storage media 1422 (e.g., a solid-state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can also be connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer 1450. The remote computer 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. The network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a defined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of these instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used, or modifications and additions can be made to the described implementation for performing the same or equivalent function of the corresponding implementation without deviating therefrom. Still further, multiple processing chips or multiple devices can share the performance of one or more functions described herein, and similarly, storage can be implemented across different devices. Accordingly, the various embodiments are not to be limited to any single implementation, but rather are to be construed in breadth, spirit, and scope in accordance with the appended claims.

What is claimed is:

1. A system, comprising:
a processor; and
a memory that stores executable instructions that, when executed by the processor, facilitate performance of operations, comprising:
executing a first write action at a storage memory associated with a file system,
wherein the first write action journals transaction log entries to log storage objects defined at the storage memory,
wherein the log storage objects define multiple chunks of the storage log,
wherein the transaction log entries comprise instructions for fulfilling a set of transactions, and
wherein the transactions of the set of transactions define change to the file system;
generating a set of transaction marker lists, at the storage memory or at another storage memory, and separate from the transaction log entries, comprising an ordered sequence of transaction markers referencing the transaction log entries,
wherein the transaction markers are comprised by marker metadata that corresponds to transaction entry metadata of the transaction log entries;
synchronizing a first portion of modified system metadata, corresponding to a first portion of the transaction log entries,
wherein the synchronizing comprises executing a second write action to write the first portion of modified system metadata to a persistent storage associated with the file system;
in connection with the synchronizing of the first portion of the modified system metadata, evaluating the marker metadata of the set of transaction marker lists, comprising reading the marker metadata of the set of transaction marker lists, resulting in identifying a first portion of transaction markers referencing the first portion of the transaction log entries,
wherein the identifying of the first portion of transaction markers comprises identifying first marker metadata of the transaction markers of the first portion of transaction markers that references the modified system metadata that has been synchronized, and
wherein the identifying of the first portion of transaction markers further comprises identifying the transaction markers of the first portion of transaction markers as having a location at the ordered sequence, wherein all lower sequenced transaction markers have already been retired from the set of transaction marker lists, and wherein additional transaction markers not included in the first portion of transaction markers remain corresponding to transaction log entries that correspond to non-synchronized modified system metadata; and
retiring the first portion of transaction markers from the set of transaction marker lists,
wherein the retiring comprises deleting the first marker metadata corresponding to the first portion of the transaction markers from the set of transaction marker lists, resulting in clearing of at least a portion of a log storage object of the log storage objects.

2. The system of claim 1, wherein the first portion of transaction markers that is retired are individually at heads of the set of transaction marker lists prior to being retired.

3. The system of claim 1, wherein the identifying of the first portion of transaction markers is performed absent any determination of dependency among the transactions of the set of transactions.

4. The system of claim 1, further comprising:
identifying the additional transaction markers that are not included in the first portion of transaction markers as not to be retired and as being higher sequenced transaction markers than the transaction markers of the first portion of transaction markers.

5. The system of claim 1, further comprising:
in connection with additional synchronizing of additional modified system metadata corresponding to additional transaction log entries other than the first portion of transaction log entries, performing additional evaluations of the set of transaction marker lists, comprising reading the marker metadata of the set of transaction marker lists, until all transaction markers corresponding to the set of transactions are retired.

6. The system of claim 5, further comprising:
performing the additional synchronizing at selected intervals unassociated with the evaluating of the set of transaction marker lists and absent use of the set of transaction marker lists.

7. The system of claim 1, further comprising:
in connection with the retiring, clearing memory buffers that comprise the modified system metadata having been synchronized and that correspond to the first portion of transaction markers.

8. The system of claim 1, wherein the multiple chunks of the storage log are first multiple chunks, wherein a global head is moved along the transaction markers of second multiple chunks of the set of transaction marker lists in response to individual retirement of each transaction marker, and wherein a transaction marker of the ordered sequence of transaction markers is retireable from the set of transaction marker lists only upon being set equal to the global head.

9. The system of claim 1, wherein the operations further comprise:
assigning the transaction markers to the set of transaction marker lists based on which chunk of the multiple chunks was employed to journal the transaction log entries that respectively correspond to the transaction markers.

10. A method, comprising:
storing, by a system operatively coupled to at least one processor, a set of transaction log entries at log space of a storage log associated with a file system, wherein the set of transaction log entries comprise instructions for fulfilling a set of transactions that define change to the file system;
assigning, by the system, in an ordered sequence corresponding to a sequence order of journalling of the set of transaction log entries to the log space, transaction markers to a set of transaction marker lists comprising one or more transaction marker lists,
wherein the transaction markers reference the set of transaction log entries,
wherein the assigning comprises generating the transaction markers comprising marker metadata at the storage log or at another storage memory,
wherein the marker metadata corresponds to transaction entry metadata of the set of transaction log entries, and
wherein the marker metadata is stored separate from the set of transaction log entries;
synchronizing, by the system, modified system metadata corresponding to the transaction log entries, comprising executing a write action to write the modified system metadata to a persistent storage;
for individual transaction markers of the transaction markers, generating, by the system, log holds that prevent reuse of the log space corresponding to the set of transaction log entries that correspond to the individual transaction markers until evaluating the set of transaction marker lists has been performed;
performing the evaluating comprising reading the marker metadata of a first portion of the transaction markers, to verify that writing of the modified system metadata corresponding to the first portion of the transaction markers has been executed to the persistent storage, the evaluating comprising comparing the marker metadata of the first portion of the transaction markers to a sequence number of a global head transitioning the transaction markers of the set of transaction marker lists, wherein additional transaction markers not included in the first portion of transaction markers remain corresponding to transaction log entries that correspond to non-synchronized modified system metadata; and
based on the evaluating, deleting the marker metadata corresponding to the transaction markers from the set of transaction marker lists, resulting in clearing of at least a portion of the storage or the other storage memory.

11. The method of claim 10, further comprising:
synchronizing, by the system, the modified system metadata corresponding to the set of transaction log entries at selected intervals that are unassociated with the evaluating of the set of transaction marker lists, that are unassociated with additional evaluations of the set of transaction marker lists, and absent use of the set of transaction marker lists.

12. The method of claim 10, further comprising:
employing, by the system, the log holds associated with a set of memory buffers that comprise the modified system metadata, wherein respective ones of the log holds are maintained to prevent the reuse of the log space until the writing of the modified system metadata corresponding to memory buffers of the set of memory buffers and corresponding to the respective ones of the log holds is written to the persistent storage, and until the writing of the modified system metadata further satisfies the evaluating,
wherein the log holds correspond on a 1-to-1 basis to log storage objects of the log space to which the transaction log entries are journalled.

13. The method of claim 10, further comprising:
as a result of the evaluating of the set of transaction marker lists and as a result of the writing of the modified system metadata to the persistent storage, identifying, by the system, the log space comprising the transaction log entries as being available to be released by the system; and
clearing, by the system, the log space of transaction log entries of the set of transaction log entries at intervals directly associated with the evaluating of the set of transaction marker lists and with additional evaluations of the set of transaction marker lists.

14. The method of claim 10, further comprising:
assigning, by the system, the transaction markers to the set of transaction marker lists based on which chunk of multiple chunks of the log space was employed to journal the transaction log entries that respectively correspond to the transaction markers.

15. A non-transitory machine-readable medium, comprising executable instructions that, when executed by a processor, facilitate performance of operations, the operations comprising:
generating a set of transaction marker lists at a storage memory, comprising one or more transaction marker lists, with an ordered sequence of transaction markers individually corresponding to transaction log entries of a set of transactions journalled to multiple chunks of a log space for effecting change to a file system,
wherein the transaction markers comprise marker metadata that identifies the transaction markers by sequence numbers according to the ordered sequence,
wherein the marker metadata corresponds to transaction entry metadata of the transaction log entries, and
wherein the transaction markers are stored separate from the set of transactions;
in connection with the set of transactions being journalled to the multiple chunks, evaluating the set of transaction marker lists over a series of iterations to determine which transaction markers are able to be identified as free due to modified system metadata related thereto being already synchronized to a persistent storage to effect the change to the file system,
wherein the evaluating comprises reading the marker metadata of a first portion of transaction markers of the set of transaction marker lists and verifying that writing of the modified system metadata corresponding to the first portion of transaction markers has been executed to the persistent storage,
wherein additional transaction markers not included in the first portion of transaction markers remain corresponding to transaction log entries that correspond to modified system metadata not yet synchronized to the persistent storage; and
in connection with individual evaluations of the evaluations, retiring from the set of transaction marker lists one or more transaction markers, wherein the one or more transaction markers have been identified as free, and wherein all transaction markers having lower sequence numbers, of the sequence numbers, than the one or more transaction markers have also been retired,
wherein the retiring comprises deleting first marker metadata corresponding to the first portion of the transaction markers from the set of transaction marker lists, resulting in clearing of at least a portion of the storage memory.

16. The non-transitory machine-readable medium of claim 15, wherein the operations further comprise:
in connection with the individual evaluations, determining whether to move a global head of the multiple chunks represented at the set of transaction marker lists to a next transaction marker having a next sequence number in the ordered sequence at the set of transaction marker lists.

17. The non-transitory machine-readable medium of claim 16, wherein the operations further comprise:
ceasing the series of iterations upon the global head being equal to a respective global tail.

18. The non-transitory machine-readable medium of claim 15, wherein the operations further comprise:
in connection with the generating of the set of transaction marker lists, generating a set of log holds corresponding to storage log objects at the multiple chunks; and
in connection with the retiring of the one or more transaction markers, releasing one or more log holds, of the set of log holds, that correspond to the one or more transaction markers, and clearing at least part of the log space that corresponds to the one or more transaction markers.

19. The non-transitory machine-readable medium of claim 15, wherein the operations further comprise:
synchronizing the modified system metadata at selected intervals unassociated with the series of iterations.

20. The non-transitory machine-readable medium of claim 15, wherein the operations further comprise:
assigning the transaction markers to the set of transaction marker lists based on which chunk of the multiple chunks of the log space was employed to journal the transaction log entries that respectively correspond to the transaction markers.

\* \* \* \* \*